US012305095B2

(12) United States Patent
Tapio et al.

(10) Patent No.: US 12,305,095 B2
(45) Date of Patent: May 20, 2025

(54) ADHESIVE ARTICLES AND METHODS

(71) Applicant: 3M INNOVATIVE PROPERTIES COMPANY, St. Paul, MN (US)

(72) Inventors: Scott M. Tapio, Falcon Heights, MN (US); Patrick D. Hyde, Burnsville, MN (US); Jeffrey M. Imsande, Menomonie, WI (US); Terry R. Ray, Oakdale, MN (US); Christopher R. Johnson, Eagan, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 837 days.

(21) Appl. No.: 17/309,341

(22) PCT Filed: Dec. 13, 2019

(86) PCT No.: PCT/IB2019/060783
§ 371 (c)(1),
(2) Date: May 20, 2021

(87) PCT Pub. No.: WO2020/121278
PCT Pub. Date: Jun. 18, 2020

(65) Prior Publication Data
US 2022/0002596 A1 Jan. 6, 2022

Related U.S. Application Data

(60) Provisional application No. 62/779,738, filed on Dec. 14, 2018.

(51) Int. Cl.
*C09J 7/38* (2018.01)
*C09J 153/00* (2006.01)

(52) U.S. Cl.
CPC .............. *C09J 7/387* (2018.01); *C09J 153/00* (2013.01); *C09J 2453/00* (2013.01); *C09J 2491/00* (2013.01)

(58) Field of Classification Search
None
See application file for complete search history.

(56) References Cited

U.S. PATENT DOCUMENTS

| | | |
|---|---|---|
| 3,121,021 A | 2/1964 | Copeland |
| 3,908,650 A | 9/1975 | Dunshee |
| 4,096,203 A | 6/1978 | St. Clair |
| 4,167,914 A | 9/1979 | Mladota |
| 4,655,210 A | 4/1987 | Edenbaum |
| 4,693,776 A | 9/1987 | Krampe |
| 4,906,240 A | 3/1990 | Reed |
| 5,049,417 A | 9/1991 | Tsubota |
| H1402 H | 1/1995 | Chin |
| 5,459,193 A | 10/1995 | Anderson |
| 5,641,506 A | 6/1997 | Talke |
| 5,810,756 A | 9/1998 | Montecalvo |
| 6,025,071 A | 2/2000 | Cameron |
| 6,162,859 A * | 12/2000 | Lu .................. C09J 7/387 |
| | | 524/505 |
| 8,703,263 B2 | 4/2014 | Goubard |
| 9,562,173 B2 | 2/2017 | Jeon |
| 2004/0202814 A1* | 10/2004 | Moeller .............. C09J 7/387 |
| | | 428/40.1 |
| 2007/0227653 A1 | 10/2007 | Tsuda |
| 2007/0249759 A1* | 10/2007 | Miller .................. C08J 3/03 |
| | | 524/270 |
| 2008/0070053 A1 | 3/2008 | Schmierer |
| 2009/0092819 A1 | 4/2009 | Malik |
| 2009/0163660 A1* | 6/2009 | Krawinkel ......... C09J 153/025 |
| | | 525/89 |
| 2011/0162782 A1* | 7/2011 | Goubard ............. B32B 27/08 |
| | | 428/41.3 |
| 2013/0052247 A1 | 2/2013 | Kergosien |
| 2014/0213955 A1* | 7/2014 | Nielsen .............. A61L 24/043 |
| | | 524/505 |
| 2015/0024159 A1 | 1/2015 | Bess |
| 2015/0111017 A1* | 4/2015 | Hogerton ............... C09J 7/22 |
| | | 428/355 R |

(Continued)

FOREIGN PATENT DOCUMENTS

| CA | 2887481 | 10/2016 |
|---|---|---|
| CN | 106497489 | 3/2017 |

(Continued)

OTHER PUBLICATIONS

EP Application 19897285 Supplementary Search Report dated Jul. 6, 2022.
Satas, "The Handbook of Pressure-sensitive Adhesives", Van Norstrand Reinhold, New York, Ed.02, pp. 172-176.
Satas, "The Handbook of Pressure-sensitive Adhesives", Van Norstrand Reinhold, New York, Ed.02, pp. 768-781.
Satas, "The Handbook of Pressure-sensitive Adhesives", Van Norstrand Reinhold, New York, Ed.02, pp. 792-807.
Tweedie, "Contact creep compliance of viscoelastic materials via nanoindentation", J. Mater res,2006, vol. 21, No. 6, pp. 1576-1589.
Young's modulus, Wikipedia 12 pages.
International Search report for PCT International Application No. PCT/IB2019/060783 mailed on Apr. 29, 2020, 3 pages.

*Primary Examiner* — Chinessa T. Golden
(74) *Attorney, Agent, or Firm* — Katherine M. Scholz

(57) ABSTRACT

A pressure sensitive adhesive article that includes: a backing having two major surfaces, at least one of which has a pressure sensitive adhesive layer disposed thereon, the pressure sensitive adhesive layer having an average thickness of 25 microns to 50 microns and including: a styrene-isoprene-containing block copolymer including a styrene-isoprene diblock copolymer and a styrene-isoprene-styrene triblock copolymer; a tackifier; and an oil; an article that includes recycled corrugate having the pressure sensitive adhesive article adhered thereto; a method of sealing a package using the pressure sensitive adhesive article; and a method of making the pressure sensitive adhesive article.

16 Claims, No Drawings

(56) References Cited

U.S. PATENT DOCUMENTS

2016/0009965 A1\* 1/2016 Robert ................... C09J 7/387
                                                    428/335
2016/0346422 A1   12/2016 Watanabe
2020/0240378 A1    7/2020 Schurz

FOREIGN PATENT DOCUMENTS

| TW | 201414563       | 4/2014  |
|----|-----------------|---------|
| WO | 199208763 A1    | 5/1992  |
| WO | WO 1997-000163  | 1/1997  |
| WO | WO 1998-000471  | 1/1998  |
| WO | 200200805 A2    | 1/2002  |
| WO | WO 2009-014881  | 1/2009  |
| WO | WO 2015-100319  | 7/2015  |
| WO | WO 2016-105501  | 6/2016  |
| WO | WO 2018-092083  | 5/2018  |
| WO | WO 2020-240378  | 12/2020 |

\* cited by examiner

ADHESIVE ARTICLES AND METHODS

CROSS REFERENCE TO RELATED APPLICATIONS

This application is a national stage filing under 35 U.S.C. 371 of PCT/IB2019/060783, filed Dec. 13, 2019, which claims the benefit of U.S. Provisional Application No. 62/779,738, filed Dec. 14, 2018, the disclosure of which is incorporated by reference in its/their entirety herein.

BACKGROUND

E-commerce businesses have migrated to the use of Water Activated Tapes (WATs). The primary advantage of WATs is the high bond of the adhesive to highly recycled corrugate (i.e., corrugated cardboard). The adhesives on these tapes are remoistenable or water activated adhesives, typically starch-based. Water and solubilized adhesive wet out and soak into the corrugate creating a destructive bond once the adhesive has dried.

A destructive bond is defined by the following, such that tamper evidence is apparent: when tape is peeled from a sealed box, corrugate fiber tear or damage is evident, and subsequently tape cannot be re-adhered; and if a tape-sealed box flap is attempted to be forced open, corrugate damage will result before the tape pops off and de-bonds.

Highly recycled corrugate is becoming a majority of the packaging market. Highly recycled corrugate has shorter fibers from multiple processing cycles and various added binding materials, which create surface characteristics of the packaging that are more difficult to adhere.

Hot melt pressure sensitive adhesives (PSAs) and acrylic emulsion PSAs are most commonly used for PSA-based box sealing tapes, and these PSA tapes perform adequately to achieve basic box closure; however, it is well known that it is difficult for typical PSAs to achieve a destructive bond to highly recycled corrugate, and therefore provide reliable tamper evidence.

Tamper evidence is becoming a requirement for many customers in the fast growing, e-commerce packaging segment.

SUMMARY

The present disclosure provides a pressure sensitive adhesive article that includes a pressure sensitive adhesive including a styrene-isoprene-containing block copolymer, a tackifier, and an oil, and a method of making such adhesive article, and a method of using such adhesive article (e.g., a method of sealing a package). Such pressure sensitive adhesive articles (e.g., tapes or labels) are particularly useful sealing packages made of recycled corrugate, at least because they provide destructive bonds and tamper evidence.

In one aspect of the disclosure, a pressure sensitive adhesive article is provided that includes: a backing having two major surfaces, at least one of which has a pressure sensitive adhesive layer disposed thereon, the pressure sensitive adhesive layer having an average thickness of 25 microns to 50 microns. The pressure sensitive adhesive includes: a styrene-isoprene-containing block copolymer including a styrene-isoprene (SI) diblock copolymer and a styrene-isoprene-styrene (SIS) triblock copolymer; a tackifier; and an oil. In the styrene-isoprene-containing block copolymer, the total amount of styrene-isoprene diblock copolymer is 15 percent by weight (wt-%) to 85 wt-%, based on the total weight of SI diblock and SIS triblock copolymers, and the total amount of styrene is 10 wt-% to 24 wt-%, based on the total weight of styrene and isoprene. In the pressure sensitive adhesive, the oil is present in an amount of 20 to 200 parts per one hundred parts of the styrene-isoprene-containing block copolymer. The pressure sensitive adhesive demonstrates a creep compliance at 30 minutes of greater than $2.0 \times 10^{-4}$ $Pa^{-1}$.

The present disclosure also provides an article that includes recycled corrugate (e.g., at least 20% recycled corrugate and up to 100% recycled corrugate) having a pressure sensitive adhesive article as described herein adhered thereto.

The present disclosure also provides methods.

In one embodiment, a method of sealing a package is provided. The method includes: providing packaging material including recycled corrugate; and sealing the packaging material with a pressure sensitive adhesive article as described herein.

In one embodiment, the method of making a pressure sensitive adhesive article is provided. The method includes: providing a backing having two major surfaces; providing a coatable adhesive composition; applying the coatable adhesive composition to at least one major surface of the backing; and exposing the coatable adhesive composition to conditions effective to harden the composition and form a layer of a pressure sensitive adhesive having an average thickness of 25 microns to 50 microns. The coatable adhesive composition includes: a styrene-isoprene-containing block copolymer including a styrene-isoprene diblock copolymer and a styrene-isoprene-styrene triblock copolymer; a tackifier; and an oil. In the styrene-isoprene-containing block copolymer, the total amount of styrene-isoprene diblock copolymer is 15 wt-% to 85 wt-%, based on the total weight of SI diblock and SIS triblock copolymers, and the total amount of styrene is 10 wt-% to 24 wt-%, based on the total weight of styrene and isoprene. In the coatable adhesive composition, the oil is present in an amount of 20 to 200 parts per one hundred parts of the styrene-isoprene-containing block copolymer. The pressure sensitive adhesive demonstrates a creep compliance at 30 minutes of greater than $2.0 \times 10^{-4}$ $Pa^{-1}$.

As used herein, a pressure-sensitive adhesive (PSA) can be any material that has PSA properties as described at pages 172-176 of *The Handbook of Pressure-sensitive Adhesives* (Satas, $2^{nd}$ Edition, Van Norstrand Reinhold, New York, NY). Useful PSAs are either solvent or hot-melt processable and meet the Dahlquist criteria at use temperatures.

As used herein, the term "glass transition temperature" or "Tg" refers to the temperature at which an amorphous, solid material undergoes a reversible transition to a molten, rubber-like state. The Tg may be measured or calculated using the Fox equation. Application of the Fox equation to estimate the Tg of polymers is well known to one skilled in the art.

Herein, the term "aliphatic" means a saturated or unsaturated linear or branched hydrocarbon. The term "cycloaliphatic" means a cyclic hydrocarbon having properties resembling those of aliphatic compounds.

Herein, the term "aromatic" means a mono- or polynuclear aromatic compound.

Herein, the term "room temperature" refers to a temperature of 20° C. to 25° C. or 22° C. to 25° C.

Herein, the term "comprises" and variations thereof do not have a limiting meaning where these terms appear in the description and claims. Such terms will be understood to imply the inclusion of a stated step or element or group of steps or elements but not the exclusion of any other step or element or group of steps or elements. By "consisting of" is meant including, and limited to, whatever follows the phrase "consisting of." Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof).

The words "preferred" and "preferably" refer to embodiments of the disclosure that may afford certain benefits, under certain circumstances. However, other claims may also be preferred, under the same or other circumstances. Furthermore, the recitation of one or more preferred claims does not imply that other claims are not useful, and is not intended to exclude other claims from the scope of the disclosure.

In this application, terms such as "a," "an," and "the" are not intended to refer to only a singular entity, but includes the general class of which a specific example may be used for illustration. The terms "a," "an," and "the" are used interchangeably with the term "at least one." The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise.

The term "and/or" means one or all of the listed elements or a combination of any two or more of the listed elements.

Also herein, all numbers are assumed to be modified by the term "about" and in certain embodiments, preferably, by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used. Herein, "up to" a number (e.g., up to 50) includes the number (e.g., 50).

Also herein, the recitations of numerical ranges by endpoints include all numbers subsumed within that range as well as the endpoints (e.g., 1 to 5 includes 1, 1.5, 2, 2.75, 3, 3.80, 4, 5, etc.) and any sub-ranges (e.g., 1 to 5 includes 1 to 4, 1 to 3, 2 to 4, etc.).

As used herein, the terms "ambient temperature" or "room temperature" refers to a temperature of 20° C. to 25° C. or 22° C. to 25° C.

The term "in the range" or "within a range" (and similar statements) includes the endpoints of the stated range.

Groupings of alternative elements or embodiments disclosed herein are not to be construed as limitations. Each group member may be referred to and claimed individually or in any combination with other members of the group or other elements found therein. It is anticipated that one or more members of a group may be included in, or deleted from, a group for reasons of convenience and/or patentability. When any such inclusion or deletion occurs, the specification is herein deemed to contain the group as modified thus fulfilling the written description of all Markush groups used in the appended claims.

Reference throughout this specification to "one embodiment," "an embodiment," "certain embodiments," or "some embodiments," etc., means that a particular feature, configuration, composition, or characteristic described in connection with the embodiment is included in at least one embodiment of the invention. Thus, the appearances of such phrases in various places throughout this specification are not necessarily referring to the same embodiment of the invention. Furthermore, the particular features, configurations, compositions, or characteristics may be combined in any suitable manner in one or more embodiments.

The above summary of the present disclosure is not intended to describe each disclosed embodiment or every implementation of the present invention. The description that follows more particularly exemplifies illustrative embodiments. In several places throughout the application, guidance is provided through lists of examples, which examples may be used in various combinations. In each instance, the recited list serves only as a representative group and should not be interpreted as an exclusive list. Thus, the scope of the present disclosure should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Although various theories and possible mechanisms may have been discussed herein, in no event should such discussions serve to limit the claimable subject matter.

DETAILED DESCRIPTION OF ILLUSTRATIVE EMBODIMENTS

The present disclosure provides a pressure sensitive adhesive article that includes a pressure sensitive adhesive including a styrene-isoprene-containing block copolymer, a tackifier, and an oil, a method of making such adhesive article, and a method of using such adhesive article. Such adhesive articles (e.g., tapes or labels) are particularly useful sealing packages made of recycled corrugate (i.e., recycled corrugated cardboard).

Thus, the present disclosure provides an article that includes recycled corrugate (typically in the form of a box used in packaging and/or shipping) having a pressure sensitive adhesive article as described herein adhered thereto. Also, the present disclosure provides a method of sealing a package, wherein the method includes: providing packaging material that includes recycled corrugate; and sealing the packaging material with a pressure sensitive adhesive article as described herein.

In one aspect of the disclosure, a pressure sensitive adhesive article is provided that includes: a backing having two major surfaces, at least one of which has a pressure sensitive adhesive layer disposed thereon, the pressure sensitive adhesive layer having an average thickness of no more than 50 microns (i.e., 2 mils). In certain embodiments, the pressure sensitive adhesive layer has an average thickness of at least 25 microns (i.e., 1 mil).

The pressure sensitive adhesives (PSAs) described herein include: a styrene-isoprene-containing block copolymer including a styrene-isoprene diblock copolymer and a styrene-isoprene-styrene triblock copolymer; a tackifier; and an oil. In the styrene-isoprene-containing block copolymer, the total amount of styrene-isoprene diblock copolymer is 15 wt-% to 85 wt-%, based on the total weight of SI diblock and SIS triblock copolymers, and the total amount of styrene is 10 wt-% to 24 wt-%, based on the total weight of styrene and isoprene.

In the pressure sensitive adhesives of the present disclosure, the oil is present in an amount of 20 to 200 parts per one hundred parts of the styrene-isoprene-containing block copolymer. Such PSAs can be made using solvent or hot-melt processing conditions. Generally, if solvent processing is used, higher amounts of oil can be added to a composition.

In certain embodiments, pressure sensitive adhesives of the present disclosure demonstrate a creep compliance at 30 minutes of greater than $2.0 \times 10^{-4}$ $Pa^{-1}$ or greater than $3.6 \times 10^{-4}$ $Pa^{-1}$. In certain embodiments, pressure sensitive adhesives of the present disclosure demonstrate a creep compliance at 30 minutes of up to $1.0 \times 10^{-4}$ $Pa^{-1}$.

Pressure sensitive adhesives having a creep compliance value within these ranges will typically adhere effectively to recycled corrugate and function effectively to seal packages made of recycled corrugate (i.e., recycled corrugated cardboard). Recycled corrugate is typically used in making packaging and/or shipping boxes (in a wide variety of shapes and sizes) in amounts of, e.g., at least 20% recycled corrugate and up to 100% recycled corrugate.

Effective sealing function of pressure sensitive adhesives of the present disclosure can be determined using the Box Plunge Test described in the Examples Section. In this test, a pressure sensitive adhesive article of the present disclosure (pressure sensitive adhesive disposed on a backing) passes (i.e., has a positive result in) the Box Plunge Test if it forms a destructive bond to recycled corrugate, wherein the corrugate is damaged (e.g., corrugate fiber tear or corrugate tear).

Thus, a pressure sensitive adhesive article that passes (i.e., has a positive result in) the Box Plunge Test will typically have a pressure sensitive adhesive with a creep compliance at 30 minutes of greater than $2.0 \times 10^{-4}$ $Pa^{-1}$.

In certain embodiments, pressure sensitive adhesives of the present disclosure demonstrate a holding power to stainless steel of less than 1000 minutes, less than 900, less than 800, less than 700, less than 600, less than 500, less than 400 minutes, or less than 300 minutes. In certain embodiments, pressure sensitive adhesives of the present disclosure demonstrate a holding power to stainless steel of at least 10 minutes, at least 15 minutes, or at least 20 minutes.

In certain embodiments, pressure sensitive adhesives of the present disclosure have a Fox glass transition temperature (a calculated Tg) of at least −30° C., or at least −15° C. In certain embodiments, pressure sensitive adhesives of the present disclosure have a Fox glass transition temperature (Tg) of up to 0° C. (or up to −5° C.).

In certain embodiments, pressure sensitive adhesives (or adhesive articles wherein the pressure sensitive adhesive is disposed on a backing) of the present disclosure are nonremovable. In this context, "nonremovable" adhesives or articles leave a residue on a surface when removed therefrom, in contrast to the adhesives described by U.S. Pat. No. 6,025,071 (Cameron et al.). In certain embodiments, such adhesive articles demonstrate a peel force from stainless steel of at least 70 oz/in (77.8 N/dm), using ASTM D3330/D330M-04 (2018).

Styrene-Isoprene-Containing Block Copolymers

The block copolymers useful in the pressure sensitive adhesives of the present disclosure include a blend of A-B-A triblock and A-B diblock copolymers. More specifically, the styrene-isoprene-containing block copolymers useful in the pressure sensitive adhesives of the present disclosure include a styrene-isoprene (SI) diblock copolymer and a styrene-isoprene-styrene (SIS) triblock copolymer. Such SIS triblocks include styrene endblocks and isoprene midblocks (SIS).

In certain embodiments of a styrene-isoprene-containing block copolymer, the total amount of styrene-isoprene diblock copolymer is present in an amount of at least 15 wt-%, at least 20 wt-%, at least 25 wt-%, at least 30 wt-%, at least 35 wt-%, at least 40 wt-%, at least 45 wt-%, at least 50 wt-%, or at least 55 wt-%, based on the total weight of SI diblock and SIS triblock copolymers. In certain embodiments of a styrene-isoprene-containing block copolymer, the total amount of styrene-isoprene diblock copolymer is present in an amount of up to 85 wt-%, based on the total weight of SI diblock and SIS triblock copolymers.

In certain embodiments, the total amount of styrene-isoprene diblock copolymer in the pressure sensitive adhesive is greater than in the styrene-isoprene-containing block copolymer added to a reaction mixture for making the pressure sensitive adhesive. This is particularly true when the adhesive is made using a hot-melt coating process.

In certain embodiments of a styrene-isoprene-containing block copolymer, the total amount of styrene is present in an amount of at least 10 wt-%, at least 11 wt-%, at least 12 wt-%, at least 13 wt-%, at least 14 wt-%, or at least 15 wt-%, based on the total weight of styrene and isoprene. In certain embodiments of a styrene-isoprene-containing block copolymer, the total amount of styrene is present in an amount of up to 24 wt-%, based on the total weight of styrene and isoprene. In certain embodiments of a styrene-isoprene-containing block copolymer, the total amount of styrene is present in an amount of 20.5 wt-% to 23.5 wt-%, based on the total amount of styrene and isoprene. An exemplary such copolymer is that available under the trade name KRATON D1119P, from Kraton Polymers LLC (Houston, TX).

In certain embodiments, the styrene-isoprene-containing block copolymers have a linear or radial configuration. In certain embodiments, the styrene-isoprene-containing block copolymers have a linear configuration.

In certain embodiments of the SIS triblocks, the styrene endblocks have molecular weights ranging from 8,000 grams per mole (g/mol) to 40,000 g/mol. In certain embodiments of the SIS triblocks, the isoprene midblocks have molecular weights ranging from 25,000 g/mol to 250,000 g/mol.

The coupling efficiency of a styrene-isoprene-containing block copolymer is inversely proportional to the diblock content. For instance, a block copolymer having a coupling efficiency of 100% would have no diblock concentration and a block copolymer having a coupling efficiency of 65% would have 35% A-B diblock and 65% A-B-A triblock. In certain embodiments of the present disclosure, styrene-isoprene-containing block copolymers have a coupling efficiency of less than 55% or a diblock concentration of at least 55%.

In certain embodiments of the present disclosure, styrene-isoprene-containing block copolymers have a melt flow index (i.e., melt index) of up to 30 grams per 10 minutes (30 g/10 min), or up to 25 g/10 min, as measured by ASTM Method D 1238, Condition G. In certain embodiments of the present disclosure, styrene-isoprene-containing block copolymers have a melt flow index (i.e., melt index) of at least 5 g/10 min, or at least 7 g/10 min, as measured by ASTM Method D 1238, Condition G.

Useful examples of a styrene-isoprene-containing block copolymer includes that available under the trade name KRATON D 1119P (linear SIS with 22% styrene, 66% diblock and a melt index of about 25 g/10 min) from Kraton Polymers LLC (Houston, TX). Other examples include those available under the trade names QUINTAC 3421 (linear SIS with 14% styrene, 26% diblock and a melt index of 10 g/10 min), QUINTAC 3433N (linear SIS with 16% styrene, 56% diblock and a melt index of 12 g/10 min), QUINTAC 3520 (linear SIS with 15% styrene, 78% diblock and a melt index of 7 g/10 min), from Zeon Corporation (Tokyo, JP). Other useful examples include those available under the trade names VECTOR 4114 (linear SIS with 15% styrene, 42% diblock and a melt index of 25 g/10 min), VECTOR 4116 (linear SIS with 16% styrene, 55% diblock and a melt index of 12 g/10 min), and VECTOR 4187 (radial SIS with 18% styrene, 78% diblock and a melt index of 13 g/10 min) from TSRC Inc. (Houston, TX).

In certain embodiments, the adhesive (or coatable adhesive composition) includes a styrene-isoprene-containing copolymer in an amount of at least 10 wt-%, or at least 15 wt-%, based on the total weight of the adhesive (or coatable adhesive composition). In certain embodiments, the adhesive (or coatable adhesive composition) includes a styrene-isoprene-containing copolymer in an amount of up to 40 wt-%, based on the total weight of the adhesive (or coatable adhesive composition).

Tackifiers

Styrene-isoprene-containing copolymers can be modified by the addition of one or more tackifying resins (i.e., tackifiers) to increase the tack of the pressure sensitive adhesive. Suitable tackifiers may associate with the isoprene phase or with the styrene phase of the styrene-isoprene-containing copolymers.

Suitable tackifiers may be solid at room temperature or liquid at room temperature.

Solid tackifying resins that associate with the isoprene phase generally develop tack in the PSA and have softening points (SP) less than 120° C. Examples of commercially available isoprene phase-associating resins include, but are not limited to: $C_5$ aliphatic hydrocarbon-derived resins such as the ESCOREZ 1000 series from ExxonMobil Chemical Co., the WINGTACK series from Cray Valley (Exton, PA), the PICCOTAC series from Eastman Chemical Co. (Kingsport, PA) and the QUINTONE series from Zeon Corp.; hydrogenated $C_5$ aliphatic hydrocarbon-derived resins such as the EASTOTAC H series from Eastman Chemical Co.; aromatic-modified aliphatic resins such as the ESCOREZ 2000 series from ExxonMobil Chemical Co. and the NORSOLENE M series from Cray Valley; cycloaliphatic $C_9$ hydrocarbon resins such as the ARKON P series (fully hydrogenated) and ARKON M series (partially hydrogenated) from Arakawa Chemical Inc. (Chicago, IL); cycloaliphatic $C_{10}$ hydrocarbons such as the ESCOREZ 5000 series from ExxonMobil Chemical Co.; hydrogenated pure monomer resins such as the REGALREZ series from Eastman Chemical Co.; gum rosin esters such as the FORAL series and the STAYBELITE A and E series from Pinova, Inc. (Brunswick, GA); tall oil rosin esters such as the SYLVATAC and SYLVALITE series from Kraton Polymers LLC (Houston, TX), the WESTREZ 5000 series from MeadWestvaco Corp. (Richmond, VA) and the PERMALYN series from Eastman Chemical Co.; polyterpenes such as the PICCOLYTE A, F, C and S series from Pinova, Inc.; turpentines such as SYLVARES TP 2019 (SP 24° C.) from Kraton Polymers LLC.

Solid resins that associate with the styrene phase tend to stiffen the pressure sensitive adhesive. Examples of commercially available styrene phase-associating resins include, but are not limited to: polyaromatics such as PICCO series of aromatic hydrocarbon resin (SP=100° C. to 142° C.) from Eastman Chemical Co.; coumarone-indene resins such as CUMAR P-25 from Neville Chemical Co. (Pittsburgh, PA); and other high-solubility resins derived from coal tar or petroleum and having softening points above about 85° C. such as SYLVARES SA 100 alpha-methyl styrene resin from Kraton Polymers LLC and the PICCOTEX series of alpha-methyl styrene/vinyl toluene resins from Eastman Chemical Co.

Examples of commercially available isoprene phase-associating liquid resins include, but are not limited to: alpha-pinene-derived polyterpenes such as that available under the trade name PICCOLYTE A25 (midpoint Tg −20° C., SP 25° C.) from Pinova, Inc.; beta-pinene-derived polyterpenes such as that available under the trade name PICCOLYTE S25 (midpoint Tg −20° C., SP 25° C.) from Pinova, Inc.; hydrogenated C9-derived aliphatic resins such as that available under the trade name REGALREZ 1018 (midpoint Tg −20° C., SP 20° C.) from Eastman Chemical Co., and that available under the trade name WINGTACK 10 (midpoint Tg −30° C., SP 10° C.) from Cray Valley; and tall oil-based liquid rosin esters such as that available under the trade name SYLVALITE RE10L (midpoint Tg −20° C., SP 10° C.) from Kraton Polymers.

Combinations of various tackifying resins may be used, whether solid or liquid, in the pressure sensitive adhesives described herein.

In certain embodiments, the adhesive (or coatable adhesive composition) includes a tackifier (or a total amount of tackifier if more than one is used) in an amount of at least 100 parts, or at least 125 parts, per one hundred parts styrene-isoprene-containing block copolymer. In certain embodiments, the adhesive (or coatable adhesive composition) includes a tackifier (or a total amount of tackifier if more than one is used) in an amount of up to 365 parts, or up to 335 parts, per one hundred parts styrene-isoprene-containing block copolymer.

The total amount of solid and liquid tackifiers present in the pressure sensitive adhesives described herein can be calculated using the Flory-Fox Equation:

$$\text{Adhesive } TG = [(W_{isoprene}/TG_{isoprene}) + (W_{tackifier(solid)}/TG_{tackifier(solid)}) + (W_{tackifier(liquid)}/TG_{tackifier(liquid)}) + (W_{plasticizing\ oil}/TG_{plasticizing\ oil})]^{-1}$$

where "W" is weight fraction of the component and "TG" is the glass transition of the component in ° K. Assuming an isoprene midblock Tg of −61° C. (212° K), a liquid tackifier Tg range from −30° C. (243K) to −15° C. (258K), a solid tackifier Tg range from +35 C. (308° K) to +74° C. (347° K), and a plasticizing oil Tg of approximately −64° C. (209° K), the Fox adhesive (midblock-isoprene) range from −30° C. to 0° C., a styrene-isoprene-containing block copolymer fraction of 15 wt-% to 40 wt-%, and a plasticizer concentration of 20 parts to 200 parts, per one hundred parts of the styrene-isoprene-containing block copolymer, the range of total solid and liquid tackifying resins present in a pressure sensitive adhesive of the present disclosure is 100 parts to 365 parts, or 125 parts to 335 parts, per one hundred parts styrene-isoprene-containing block copolymer.

Oils

A liquid component is used in the pressure sensitive adhesives of the present disclosure to provide fluidity, decrease viscosities, peel values, and storage moduli (G'), and generally lower the glass transition temperatures of the adhesives.

The liquid component includes one or more oils (i.e., plasticizing oils). Suitable oils include those that are low in volatility, transparent, and have as little color and odor as possible.

Useful oils include mineral and petroleum-based hydrocarbon oils. In certain embodiments, the oils used are primarily hydrocarbon oils that are generally low in aromatic content. In certain embodiments, the oils include hydrocarbon oils having no more than 30 wt-%, or no more than 15 wt-%, aromatic content. In certain embodiments, the aromatic carbon content of the plasticizing oil ranges from 0 to 30 wt-%, or from 0 to 15 wt-%.

In certain embodiments, the oils include hydrocarbon oils having paraffinic and/or naphthenic character. In certain embodiments, the oils have formula weights ranging from about 150 grams/mole to 600 grams/mole. Useful oils also include vegetable oils and their derivatives, as well as similar plasticizing liquid elastomers (e.g., polybutene).

Examples of useful plasticizer oils include, but are not limited to: naphthenic petroleum-based oils such as CALSOL 5550 and CALSOL 850, having 5% and 15% aromatic carbon content respectively, available from Calumet Specialty Products Partners, L.P. (Indianapolis, IN) and Citgo TUFFLO Naphthenic Process Oils from Citgo Petroleum Corp. (Houston, TX); paraffinic petroleum-based oils such as KAYDOL White Mineral Oil from Sonneborn Refined Products (Parsippany, NJ) and Citgo TUFFLO Paraffinic Process Oils.

In certain embodiments, suitable plasticizing oils have a Tg that ranges from −80° C. to −60° C.

In certain embodiments, one or more oils (i.e., plasticizing oils) may be present in the adhesives (or coatable adhesive compositions) of the present disclosure in an amount of at least 20 parts, or at least 25 parts, per hundred parts of styrene-isoprene-containing block copolymer. In certain embodiments, one or more oils (i.e., plasticizing oils) may be present in the adhesives (or coatable adhesive compositions) of the present disclosure in an amount of up to 200 parts, or up to 150 parts, per hundred parts of styrene-isoprene-containing block copolymer.

Optional Additives

Pressure sensitive adhesives of the present disclosure may include one or more optional additives. Such additives, if used, may be used in amounts well-known to those skilled in the art.

Examples of optional additives include pigments, fillers, antioxidants, and combinations thereof.

Pigments and fillers can be used to modify cohesive strength and stiffness, cold flow, and tack, as well as chemical resistance and gas permeability of a pressure sensitive adhesive described herein. Inorganic fillers include both micron and nanometer particle size distributions of calcium carbonate, carbon black, clays, hydrated silicas, calcium silicates and silico-aluminates, mica, graphite, and talc. Other fillers can include glass or polymeric beads or bubbles, metal particles, fibers, and the like. Each of these additives is used in an amount sufficient to produce the desired result. Typically, pigments and fillers are used in adhesives (or coatable adhesive compositions) described herein in an amount of 0.1 wt-% to 20 wt-%, based on the total weight of the adhesive (or coatable adhesive composition).

Suitable antioxidants (AO) include both primary and secondary types. Primary AOs are used to provide thermal stability during solvent or melt processing of an adhesive. Secondary AOs act in tandem with the primary AO during processing and serve to increase shelf life of the coated pressure sensitive adhesive. Examples include hindered phenols such as those available under the trade names IRGANOX 1076 and IRGANOX 1010 from BASF Corp. (Ludwigshafen, GE), thioesters such as that available under the trade name ARENOX DL from Reagens USA (Bayport, TX), phosphites such as that available under the trade name IRGAFOS 168 from BASF, and bi-functional AOs such as those available under the trade names IRGANOX 1726 and IRGANOX 1520 (both available from BASF). The AO's can be blended during the processing of the coatable adhesive compositions.

Backings

Adhesive articles of the present disclosure may include a wide variety of backings.

Examples of suitable materials used in the backings described herein include, but are not limited to, a polyethylene, a polypropylene (e.g., a biaxially oriented polypropylene), a polyester, a rubber, a vinyl, a paper, a polylactic acid, or a combination thereof (e.g., blends or layers).

In certain embodiments, backings may be in the form of laminates. In certain embodiments, a laminate may include a polymeric reinforcement film layer having two major surfaces, and a paper layer bonded to one major surface of the polymeric reinforcement film, wherein the adhesive is disposed on the major surface of the polymeric reinforcement film opposite that of the paper layer. Such backings are described in International Publication No. WO 2018/092083 A1 (3M Innovative Properties Company).

Methods of Making Adhesive Articles

The present disclosure provides methods of making adhesive articles.

In one embodiment, a method of making a pressure sensitive adhesive article includes: providing a backing having two major surfaces; providing a coatable adhesive composition; applying the coatable adhesive composition to at least one major surface of the backing; and exposing the coatable adhesive composition to conditions effective to harden the composition and form a layer of a pressure sensitive adhesive having an average thickness of 25 microns to 50 microns. The coatable adhesive composition includes: a styrene-isoprene-containing block copolymer including a styrene-isoprene diblock copolymer and a styrene-isoprene-styrene triblock copolymer; a tackifier; and an oil. In the styrene-isoprene-containing block copolymer, the total amount of styrene-isoprene diblock copolymer is 15 wt-% to 85 wt-%, based on the total weight of SI diblock and SIS triblock copolymers, and the total amount of styrene is 10 wt-% to 24 wt-%, based on the total weight of styrene and isoprene. In the coatable adhesive composition, the oil is present in an amount of 20 to 200 parts per one hundred parts of the styrene-isoprene-containing block copolymer. The pressure sensitive adhesive demonstrates a creep compliance at 30 minutes of greater than $2.0 \times 10^{-4}$ Pa$^{-1}$ (or greater than $3.6 \times 10^{-4}$ Pa$^{-1}$).

The coatable adhesive compositions can include an organic solvent (e.g., toluene, heptane, or a combination thereof), and the step of exposing the coatable adhesive composition to conditions effective to harden it involves allowing or causing the composition to dry by allowing the organic solvent to evaporate or driving it off. Such conditions typically include drying the adhesive composition at a suitable temperature (e.g., 160° F. or 71° C.) for a given residence time (e.g., 3 to 10 minutes) in a forced air convection oven.

The coatable adhesive composition can be a hot-melt coatable adhesive composition, and the step of exposing the coatable adhesive composition to conditions effective to harden it involves cooling the coatable composition, e.g., to room temperature.

Typically, whether using solvent processing or hot-melt processing, hardening typically involves forming physical crosslinks.

In certain embodiments, a process for making pressure sensitive adhesives is an adaptation of the extrusion process for making solid elastomeric gels produced by the process described in International Publication No. WO 97/00163 (3M Cmpany). Generally, this method involves making a solid elastomeric gel from a styrene block copolymer (e.g., styrene-isoprene-styrene, styrene-ethylenebutylene-styrene) and a plasticizer. The adapted method includes the steps of: (1) providing an extruder having multiple in-feed sections with each followed by a mixing section comprising combinations of dispersive and distributive mixing elements along the barrel of the extruder; (2) introducing the styrene-isoprene-containing copolymer (i.e., SUSIS copolymer) into one of the in-feed sections of the operating extruder; (3) heating and shearing the copolymer in a subsequent mixing section; (4) introducing the tackifier resin(s) and plasticizing oil(s) to the copolymer through at least one of the feeding sections in a pattern and at a rate that produces a melt stream that is devoid of large particles of undispersed SUSIS copolymer; and (5) ejecting the melt stream from the extruder via a metering melt gear pump to a coating die.

In making a pressure sensitive adhesive article, a coatable adhesive composition can be applied to a backing with a melt coating process, i.e., a process where the material is heated to soften it such that it will flow, and applying the material to a substrate where it is cooled to form a melt coated layer thereon.

A variety of methods can be used for melt coating coatable adhesive compositions, such as forward and reverse roll coating, slot die coating, extrusion draw (drop) die coating, extrusion contact die coating and extrusion calendar coating processes. Illustrative roll coating, slot die coating, and extrusion calendar coating processes are described at pages 792-807 of *The Handbook of Pressure-sensitive Adhesives* (Satas, 2$^{nd}$ Edition, Van Norstrand Reinhold, New York, NY).

Low viscosity (i.e., less than about 50 Pa-s) hot melt coatable compositions are typically coated using roll coating and slot die coating methods. These materials are liquid-like in the molten state and do not require an extrusion pumping process to deliver the materials to the coating process. High viscosity (i.e., more than about 50 Pa-s), high molecular weight (i.e., more than about 200,000 g/mol) hot melt coatable compositions are not liquid-like in the melt state due to the presence of polymer chain entanglements and require extrusion processes for mixing, pumping and coating operations. One illustrative coating method for such materials includes extrusion of the molten polymer out of a slot die into a nip formed by 2 rolls (which may have a conformable, e.g., rubber coating) and a moving substrate. If the molten polymer is tacky, the melt can be dropped onto a roller having a release coated surface and then laminated via nipping of the polymer melt to the moving substrate with a second rubber-covered roll. U.S. Pat. No. 4,167,914 (Mladota) discloses an extrusion coater, sometimes referred to as press roll coater, for hot melt adhesive formulations that employs an elongated slot coating head with a small diameter rotating rod in cooperation with a larger diameter rotating compressible press roll. The rod and press roll are each rotated at predetermined speeds by motor.

Alternatively, a coatable adhesive composition that includes one or more solvents can be made and coated onto a backing using a method as described at pages 768-781 of *The Handbook of Pressure-sensitive Adhesives* (Satas, 2$^{nd}$ Edition, Van Norstrand Reinhold, New York, NY). Exemplary solvent coating methods include reverse roll, knife-over-roll, and roll-over-roll.

Embodiments

Embodiment 1 is a pressure sensitive adhesive article comprising: a backing having two major surfaces, at least one of which has a pressure sensitive adhesive layer disposed thereon, the pressure sensitive adhesive layer having an average thickness of 25 microns to 50 microns and comprising: a styrene-isoprene-containing block copolymer comprising a styrene-isoprene (SI) diblock copolymer and a styrene-isoprene-styrene (SIS) triblock copolymer, wherein: the total amount of styrene-isoprene diblock copolymer is at least 15 wt-% (or at least 20 wt-%, at least 25 wt-%, at least 30 wt-%, at least 35 wt-%, at least 40 wt-%, at least 45 wt-%, at least 50 wt-%, or at least 55 wt-%) and up to 85 wt-%, based on the total weight of SI diblock and SIS triblock copolymers; and the total amount of styrene is at least 10 wt-% (or at least 11 wt-%, at least 12 wt-%, at least 13 wt-%, at least 14 wt-%, or at least 15 wt-%) and up to 24 wt-%, based on the total weight of styrene and isoprene; a tackifier; and an oil in an amount of at least 20 parts (or at least 25 parts) and up to 200 parts per one hundred parts of the styrene-isoprene-containing block copolymer; wherein the pressure sensitive adhesive demonstrates a creep compliance at 30 minutes of greater than $2.0 \times 10^{-4}$ Pa$^{-1}$ (or greater than $3.6 \times 10^{-4}$ Pa$^{-1}$).

Embodiment 2 is the pressure sensitive adhesive article of embodiment 1 wherein the pressure sensitive adhesive demonstrates a creep compliance at 30 minutes of up to $1.0 \times 10^{-3}$ Pa$^{-1}$.

Embodiment 3 is the pressure sensitive adhesive article of embodiment 1 or 2 wherein the pressure sensitive adhesive demonstrates a holding power to stainless steel of less than 1000 minutes (or less than 900 minutes, less than 800 minutes, less than 700 minutes, less than 600 minutes, less than 500 minutes, less than 400 minutes, or less than 300 minutes).

Embodiment 4 is the pressure sensitive adhesive article of any of the preceding embodiments wherein the pressure sensitive adhesive demonstrates a holding power to stainless steel of at least 10 minutes (or at least 15 minutes, or at least 20 minutes).

Embodiment 5 is the pressure sensitive adhesive article of any of the preceding embodiments wherein the pressure sensitive adhesive has a Fox glass transition temperature (Tg) of at least −30° C. (or at least −15° C.).

Embodiment 6 is the pressure sensitive adhesive article of any of the preceding embodiments wherein the pressure sensitive adhesive has a Fox glass transition temperature (Tg) of up to 0° C. (or up to −5° C.).

Embodiment 7 is the pressure sensitive adhesive article of any of the preceding embodiments wherein the total amount of styrene-isoprene diblock copolymer is 55 wt-% to 85 wt-%, based on the total weight of SI diblock and SIS triblock copolymers.

Embodiment 8 is the pressure sensitive adhesive article of any of the preceding embodiments wherein the total amount of styrene-isoprene diblock copolymer in the pressure sensitive adhesive is greater than in the styrene-isoprene-containing block copolymer added to a reaction mixture for making the pressure sensitive adhesive.

Embodiment 9 is the pressure sensitive adhesive article of any of the preceding embodiments wherein the total amount of styrene in the styrene-isoprene-containing block copolymer is 20.5-23.5 wt-%, based on the total amount of styrene and isoprene.

Embodiment 10 is the pressure sensitive adhesive article of any of the preceding embodiments wherein the pressure sensitive adhesive comprises a tackifier in an amount of at least 100 parts (or at least 125 parts) per one hundred parts styrene-isoprene-containing block copolymer.

Embodiment 11 is the pressure sensitive adhesive article of any of the preceding embodiments wherein the pressure sensitive adhesive comprises a tackifier in an amount of up to 365 parts (or up to 335 parts) per one hundred parts styrene-isoprene-containing block copolymer.

Embodiment 12 is the pressure sensitive adhesive article of any of the preceding embodiments wherein the pressure sensitive adhesive comprises an oil in an amount of up to 150 parts per one hundred parts styrene-isoprene-containing block copolymer.

Embodiment 13 is the pressure sensitive adhesive article of any of the preceding embodiments wherein the pressure sensitive adhesive comprises a styrene-isoprene-containing copolymer in an amount of at least 10 wt-% (or at least 15 wt-%), based on the total weight of the pressure sensitive adhesive.

Embodiment 14 is the pressure sensitive adhesive article of any of the preceding embodiments wherein the pressure sensitive adhesive comprises a styrene-isoprene-containing copolymer in an amount of up to 40 wt-%, based on the total weight of the pressure sensitive adhesive.

Embodiment 15 is the pressure sensitive adhesive article of any of the preceding embodiments wherein the tackifier is a solid resin at room temperature, a liquid resin at room temperature, or a mixture thereof.

Embodiment 16 is the pressure sensitive adhesive article of any of the preceding embodiments wherein the tackifier associates with the isoprene phase of the styrene-isoprene-containing block copolymer.

Embodiment 17 is the pressure sensitive adhesive article of embodiment 16 wherein the tackifier is a solid resin at room temperature selected from the group of $C_5$ aliphatic hydrocarbon-derived resins, hydrogenated $C_5$ aliphatic hydrocarbon-derived resins, aromatic-modified aliphatic resins, cycloaliphatic $C_9$ hydrocarbon resins, cycloaliphatic $C_{10}$ hydrocarbons, hydrogenated pure monomer resins, gum rosin esters, tall oil rosin esters, polyterpenes, turpentines, and combinations thereof.

Embodiment 18 is the pressure sensitive adhesive article of embodiment 16 wherein the tackifier is a liquid resin at room temperature selected from the group of alpha-pinene-derived polyterpenes, beta-pinene-derived polyterpenes, hydrogenated C9-derived aliphatic resins, tall oil-based liquid rosin esters, and combinations thereof.

Embodiment 19 is the pressure sensitive adhesive article of any of the preceding embodiments wherein the tackifier associates with the styrene phase of the styrene-isoprene-containing block copolymer.

Embodiment 20 is the pressure sensitive adhesive article of embodiment 19 wherein the tackifier is a solid resin at room temperature selected from the group of polyaromatics, coumarone-indene resins, resins derived from coal tar or petroleum and having softening points above 85° C., and combinations thereof.

Embodiment 21 is the pressure sensitive adhesive article of any of the preceding embodiments wherein the oil is selected from hydrocarbon oils having no more than 30 wt-% (or no more than 15 wt-%) aromatic content.

Embodiment 22 is the pressure sensitive adhesive article of embodiment 21 wherein the oil is selected from hydrocarbon oils having paraffinic and/or naphthenic character.

Embodiment 23 is the pressure sensitive adhesive article of any of the preceding embodiments wherein the styrene-isoprene-containing block copolymer is a linear or radial block copolymer.

Embodiment 24 is the pressure sensitive adhesive article of embodiment 23 wherein the block copolymer is a linear block copolymer.

Embodiment 25 is the pressure sensitive adhesive article of any of the preceding embodiments wherein the styrene-isoprene-containing block copolymer has a melt flow index of at least 5 g/10 min (or at least 7 g/10 min).

Embodiment 26 is the pressure sensitive adhesive article of any of the preceding embodiments wherein the styrene-isoprene-containing block copolymer has a melt flow index of up to 30 g/10 min (or up to 25 g/10 min).

Embodiment 27 is the pressure sensitive adhesive article of any of the preceding embodiments wherein the backing comprises a polyethylene, a polypropylene (e.g., a biaxially oriented polypropylene), a polyester, a rubber, a vinyl, a paper, a polylactic acid, or a combination thereof.

Embodiment 28 is the pressure sensitive adhesive article of any of the preceding embodiments wherein the backing comprises a laminate.

Embodiment 29 is the pressure sensitive adhesive article of embodiment 28 wherein the laminate comprises a polymeric reinforcement film layer having two major surfaces, and a paper layer bonded to one major surface of the polymeric reinforcement film, wherein the pressure sensitive adhesive is disposed on the major surface of the polymeric reinforcement film opposite that of the paper layer.

Embodiment 30 is the pressure sensitive adhesive article of any of the preceding embodiments which is nonremovable (preferably, the adhesive article demonstrate a peel force from stainless steel of at least 70 oz/in (77.8 N/dm), using ASTM D3330/D330M-04 (2018)).

Embodiment 31 is the pressure sensitive adhesive article of any of the preceding embodiments wherein the pressure sensitive adhesive comprises an additive selected from the group of pigments, fillers, antioxidants, and combinations thereof.

Embodiment 32 is the pressure sensitive adhesive article of any of the preceding embodiments which is an adhesive tape.

Embodiment 33 is the pressure sensitive adhesive article of any of embodiments 1 through 30 which is an adhesive label.

Embodiment 34 is the pressure sensitive adhesive article of embodiment 32 or 33 which forms a destructive bond to recycled corrugate (i.e., passes the Box Plunge Test).

Embodiment 35 is an article comprising recycled corrugate (e.g., at least 20% recycled corrugate and up to 100% recycled corrugate) having a pressure sensitive adhesive article of any one of embodiments 1 through 34 adhered thereto.

Embodiment 36 is the article of embodiment 35 wherein the pressure sensitive adhesive article forms a destructive bond to the recycled corrugate (i.e., passes the Box Plunge Test).

Embodiment 37 is a method of sealing a package, the method comprising: providing packaging material comprising recycled corrugate; and sealing the packaging material with a pressure sensitive adhesive article of any one of embodiments 1 through 34.

Embodiment 38 is a method of making a pressure sensitive adhesive article, the method comprising: providing a backing having two major surfaces; providing a coatable adhesive comprising: a styrene-isoprene-containing block copolymer comprising a styrene-isoprene diblock copolymer and a styrene-isoprene-styrene triblock copolymer, wherein: the total amount of styrene-isoprene diblock copolymer is at least 15 wt-% (or at least 20 wt-%, at least 25 wt-%, at least 30 wt-%, at least 35 wt-%, at least 40 wt-%, at least 45 wt-%, at least 50 wt-%, or at least 55 wt-%) and up to 85 wt-%, based on the total weight of diblock copolymer and styrene-isoprene-styrene triblock copolymer; and the total amount of styrene is at least 10 wt-% (or at least 11 wt-%, at least 12 wt-%, at least 13 wt-%, at least 14 wt-%, or at least 15 wt-%) and up to 24 wt-%, based on the total weight of styrene and isoprene; a tackifier; and an oil in an amount of at least 20 parts (or at least 25 parts) and up to 200 parts per one hundred parts of the styrene-isoprene-containing block copolymer; applying the coatable adhesive composition to at least one major surface of the backing; and exposing the coatable adhesive composition to conditions effective to harden the composition and form a layer of a pressure sensitive adhesive having an average thickness of 25 microns to 50 microns; wherein the pressure sensitive adhesive demonstrates a creep compliance at 30 minutes of greater than $2.0 \times 10^{-4}$ $Pa^{-1}$ (or greater than $3.6 \times 10^{-4}$ $Pa^{-1}$).

Embodiment 39 is the method of embodiment 38 wherein the coatable adhesive composition further comprises an additive selected from the group of pigments, fillers, antioxidants, and combinations thereof.

Embodiment 40 is the method of embodiment 38 or 39 wherein the coatable adhesive composition further comprises an organic solvent.

Embodiment 41 is the method of embodiment 40 wherein the organic solvent comprises toluene, heptane, or a combination thereof.

Embodiment 42 is the method of embodiment 38 or 39 wherein the coatable adhesive composition is a hot-melt coatable adhesive composition, and exposing the coatable adhesive composition to conditions effective to harden the composition comprises allowing the coatable adhesive composition to cool to room temperature.

Embodiment 43 is the method of any one of embodiments 38 through 42 wherein exposing the coatable adhesive composition to conditions effective to harden the composition comprises forming physical crosslinks in the composition.

Embodiment 44 is the method of any one of embodiments 38 through 43 wherein the pressure sensitive adhesive demonstrates a creep compliance at 30 minutes of up to $1.0 \times 10^{-3}$ $Pa^{-1}$.

Embodiment 45 is the method of any one of embodiments 38 through 44 wherein the pressure sensitive adhesive demonstrates a holding power to stainless steel of less than 1000 minutes (or less than 900, less than 800, less than 700, less than 600, less than 500, less than 400 minutes, or less than 300 minutes).

Embodiment 46 is the method of any one of embodiments 38 through 45 wherein the pressure sensitive adhesive demonstrates a holding power to stainless steel of at least 10 minutes (or at least 15 minutes, or at least 20 minutes).

Embodiment 47 is the method of any one of embodiments 38 through 46 wherein the pressure sensitive adhesive has a Fox glass transition temperature (Tg) of at least −30° C. (or at least −15° C.).

Embodiment 48 is the method of any one of embodiments 38 through 47 wherein the pressure sensitive adhesive has a Fox glass transition temperature (Tg) of up to 0° C. (or up to −5° C.).

Embodiment 49 is the method of any one of embodiments 38 through 48 wherein the total amount of styrene-isoprene diblock copolymer in the coatable adhesive composition is 55 wt-% to 85 wt-%, based on the total weight of SI diblock and SIS triblock copolymers.

Embodiment 50 is the method of any one of embodiments 38 through 49 wherein the total amount of styrene-isoprene diblock copolymer in the pressure sensitive adhesive is greater than in the coatable adhesive composition.

Embodiment 51 is the method of any one of embodiments 38 through 50 wherein the total amount of styrene in the styrene-isoprene-containing block copolymer is 20.5-23.5 wt-%, based on the total amount of styrene and isoprene.

Embodiment 52 is the method of any one of embodiments 38 through 51 wherein the coatable adhesive composition comprises a tackifier in an amount of at least 100 parts (or at least 125 parts) per one hundred parts styrene-isoprene-containing block copolymer.

Embodiment 53 is the method of any one of embodiments 38 through 52 wherein the coatable adhesive composition comprises a tackifier in an amount of up to 365 parts (or up to 335 parts) per one hundred parts styrene-isoprene-containing block copolymer.

Embodiment 54 is the method of any one of embodiments 38 through 53 wherein the coatable adhesive composition comprises an oil in an amount of up to 150 parts per one hundred parts styrene-isoprene-containing block copolymer.

Embodiment 55 is the method of any one of embodiments 38 through 54 wherein the coatable adhesive composition comprises a styrene-isoprene-containing copolymer in an amount of at least 10 wt-% (or at least 15 wt-%), based on the total weight of the coatable adhesive composition.

Embodiment 56 is the method of any one of embodiments 38 through 55 wherein the coatable adhesive composition comprises a styrene-isoprene-containing copolymer in an amount of up to 40 wt-%, based on the total weight of the coatable adhesive composition.

Embodiment 57 is the method of any one of embodiments 38 through 56 wherein the coatable adhesive composition comprises a tackifier that is a solid resin at room temperature, a liquid resin at room temperature, or a mixture thereof.

Embodiment 58 is the method of embodiment 57 wherein the tackifier associates with the isoprene phase of the styrene-isoprene-containing block copolymer.

Embodiment 59 is the method of embodiment 58 wherein the tackifier is a solid resin at room temperature selected from the group of $C_5$ aliphatic hydrocarbon-derived resins, hydrogenated $C_5$ aliphatic hydrocarbon-derived resins, aromatic-modified aliphatic resins, cycloaliphatic $C_9$ hydrocarbon resins, cycloaliphatic $C_{10}$ hydrocarbons, hydrogenated pure monomer resins, gum rosin esters, tall oil rosin esters, polyterpenes, turpentines, and combinations thereof.

Embodiment 60 is the method of embodiment 58 wherein the tackifier is a liquid resin at room temperature selected from the group of alpha-pinene-derived polyterpenes, beta-pinene-derived polyterpenes, hydrogenated C9-derived aliphatic resins, tall oil-based liquid rosin esters, and combinations thereof.

Embodiment 61 is the method of embodiment 57 wherein the tackifier associates with the styrene phase of the styrene-isoprene-containing block copolymer.

Embodiment 62 is the method of embodiment 61 wherein the tackifier is a solid resin at room temperature selected from the group of polyaromatics, coumarone-indene resins, resins derived from coal tar or petroleum and having softening points above 85° C., and combinations thereof.

Embodiment 63 is the method of any one of embodiments 38 through 62 wherein the oil is selected from hydrocarbon oils having no more than 30 wt-% (or no more than 15 wt-%) aromatic content.

Embodiment 64 is the method of embodiment 63 wherein the oil is selected from hydrocarbon oils having paraffinic and/or naphthenic character.

Embodiment 65 is the method of any one of embodiments 38 through 64 wherein the styrene-isoprene-containing block copolymer is a linear or radial block copolymer.

Embodiment 66 is the method of embodiment 65 wherein the block copolymer is a linear block copolymer.

Embodiment 67 is the method of any one of embodiments 38 through 66 wherein the styrene-isoprene-containing block copolymer has a melt flow index of at least 5 g/10 min (or at least 7 g/10 min).

Embodiment 68 is the method of any one of embodiments 38 through 67 wherein the styrene-isoprene-containing block copolymer has a melt flow index of up to 30 g/10 min (or up to 25 g/10 min).

Embodiment 69 is the method of any one of embodiments 38 through 68 wherein the backing comprises a polyethylene, a polypropylene (e.g., a biaxially oriented polypropylene), a polyester, a rubber, a vinyl, a paper, a polylactic acid, or a combination thereof.

Embodiment 70 is the method of any one of embodiments 38 through 69 wherein the backing comprises a laminate.

Embodiment 71 is the method of embodiment 70 wherein the laminate comprises a polymeric reinforcement film layer having two major surfaces, and a paper layer bonded to one major surface of the polymeric reinforcement film, wherein the pressure sensitive adhesive is disposed on the major surface of the polymeric reinforcement film opposite that of the paper layer.

Embodiment 72 is the method of any one of embodiments 38 through 71 wherein the pressure sensitive adhesive is nonremovable (preferably, the adhesive article demonstrates a peel force from stainless steel of at least 70 oz/in (77.8 N/dm), using ASTM D3330/D330M-04 (2018)).

Embodiment 73 is the method of any one of embodiments 38 through 72 wherein the pressure sensitive adhesive disposed on the backing forms a destructive bond to recycled corrugate (i.e., passes the Box Plunge Test).

EXAMPLES

Objects and advantages of the disclosure are further illustrated by the examples provided herein. The particular materials and amounts thereof recited in these examples, as well as other conditions and details, are merely illustrative and are not intended to be limiting. The person of ordinary skill in the art, after carefully reviewing the entirety of this disclosure, will be able to use materials and conditions in addition to those specifically described in the examples.

| Table of Abbreviations | |
| --- | --- |
| phr | Parts per hundred rubber (i.e., parts per one hundred parts of the styrene-isoprene-containing block copolymer) |
| Wt-% | Weight percent |
| Tg (or TG) | Glass transition temperature in ° C. (or ° K) |
| SIS | Styrene-isoprene-styrene triblock copolymer |
| SI | Styrene-isoprene-styrene diblock copolymer |
| SP | Softening point temperature |
| SI/SIS | Diblock to triblock styrene-isoprene-styrene ratio by weight |
| PSA | Pressure-sensitive adhesive |
| MI | Melt index |
| $C_A$ | Aromatic carbon content |
| $C_5$ | 5 carbon aliphatic hydrocarbon content |
| $C_9$ | 9 carbon aliphatic hydrocarbon content |
| $C_{10}$ | 10 carbon aliphatic hydrocarbon content |
| DMA | Dynamic mechanical analysis |
| Pa | Pascals |
| SS | Stainless-steel |
| in. | Inch |
| PSI | Pounds per square inch |
| kg | Kilogram |
| kg/cm | Kilograms/centimeter |
| m | Meter |
| cm | Centimeter |
| ECT | Edge crush test |
| POS | Positive |
| NEG | Negative |
| CTH | Controlled temperature and humidity |
| $in^2$ | Square inches |
| SPL | Cohesive split |
| min. | Minutes |
| HPS | Holding power to stainless-steel |
| ATS | Adhesion to stainless-steel |
| Ex. | Example |
| g | Grams |
| Tack. | Tackifier |
| Pts. | Parts |
| $\chi_r$ | Rubber fraction |
| PET | Polyethylene terephthalate |
| gns/24 $in^2$ | Grains per 24 square inches |
| Ct. Wt. | Coating Weight |
| GSM | Grams per square meter |
| % Sol. | Percentage solids dissolved in toluene |
| μm | Micrometer |
| GPC | Gel Permeation Chromatography |
| TSE | Twin-screw extruder |
| TME | Transverse mixing element |
| RPM | Revolutions per minute |
| lbs. | Pounds |
| mm | Millimeter |
| fpm | Feet per minute |
| mpm | Meters per minute |

| Table of Materials | |
| --- | --- |
| Trade Name | Description |
| QUINTAC 3421 (Q3421) | Linear SIS with 14/86 PS/PI, 26 wt-% SI and MI ≈ 10 g/10 min. from Zeon Corp. (Tokyo JP) |
| QUINTAC 3433N (Q3433) | Linear SIS with 16/84 PS/PI, 56 wt-% SI and MI ≈ 12 g/10 min. from Zeon Corp. (Tokyo JP) |
| QUINTAC 3520 (Q3520) | Linear SIS with 15/85 PS/PI, 78 wt-% SI and MI ≈ 7 g/10 min. from Zeon Corp. (Tokyo JP) |

-continued

Table of Materials

| Trade Name | Description |
| --- | --- |
| KRATON D1161P (KD1161) | Linear SIS with 15/85 PS/PI, 19 wt-% SI and MI ≈ 14 g/10 min. from Kraton Polymers LLC (Houston, TX USA) |
| KRATON D1119P (KD1119) | Linear SIS with 22/78 PS/PI, 66 wt-% SI and MI ≈ 25 g/10 min. from Kraton Polymers LLC (Houston, TX USA) |
| VECTOR 4114A (V4114) | Linear SIS with 15/85 PS/PI, 42 wt-% SI and MI ≈ 25 g/10 min. from Zeon Corporation (Tokyo, JP) |
| VECTOR 4187A (V4187) | Radial SIS with 18/82 PS/PI, 78 wt-% SI and MI ≈ 13 g/10 min. from Zeon Corporation (Tokyo, JP) |
| CALSOL 5550 (C5550) | Naphthenic plasticizing oil with 5% $C_A$ and TG ≈ 209° K from Calumet Specialty Products Partners, L.P. (Indianapolis, IN USA) |
| CALSOL 850 (C850) | Naphthenic plasticizing oil with 15% $C_A$ and TG ≈ 209° K from Calumet Specialty Products Partners, L.P. (Indianapolis, IN USA) |
| KAYDOL | White paraffinic mineral oil with 0% $C_A$ and TG ≈ 209° K from Sonneborn Refined Products (Parsippany, NJ USA) |
| QUINTONE K100 (K100) | $C_5$ aliphatic solid tackifying resin with SP = 100° C. and TG ≈ 327° K from Zeon Corp. (Tokyo JP) |
| IRGANOX 1010 (Irg. 1010) | Hindered primary phenolic antioxidant with MP = 118° C. from BASF Corp. (Charlotte, NC USA) |
| IRGANOX 1076 (Irg. 1076) | Hindered primary phenolic antioxidant with MP = 53° C. from BASF Corp. (Charlotte, NC USA) |
| Toluene | Solvent for SIS PSA hand spread coatings |

Test Methods

Box Plunge Test

A box plunge test was used to test for tamper evidence and box security. The box plunge test is traditionally used to measure the force needed to force open the flap of an unfilled, tape-sealed box. However, to demonstrate tamper evidence, it is necessary for the box to break (corrugate flap tears) before the tape de-bonds from the box flap. Therefore, in this case, each individual test yields a positive or negative result.

Box plunge tests were carried out on a single wall, 100% recycled, Pratt #PRA0089. Box dimensions were 16.0 inches (in.) long by 12.0 in. wide by 12.0 in. high (40.8 cm by 30.5 cm by 30.5 cm) having an Edge Crush Test (ECT) value of 32 PSI (5.7 kg/cm) and a gross weight limit of 65 pounds (29.5 kg) (available from Pratt Industries, Gonyer, GA USA). Pratt 100% recycled corrugate is one of the more challenging fiberboards to attain high levels of adhesion required to attain a destructive bond for tamper evidence.

Sample tape 2.5 inches (6.3 cm) wide and 22 inches (55.9 cm) in length was applied to the closed flaps of the bottom of the box, then smoothed down with slight hand pressure to seal. The resulting tape legs on each side of the box were a minimum of 2 in. (5.1 cm) and a maximum of 4 in. (10.2 cm). With the box remaining unfilled, the top flaps of the box were then sealed with the same sample tape in the same manner. After the sealed box dwelled for 30 minutes the plunge test was performed on the bottom followed by the top of the box.

A Chatillon DFX-100 Digital Force Gauge (available from Ametek US Gauge Division, Largo, FL USA) with a 1 inch (25.4 mm) wide×4 inch (101.6 mm) long foot was positioned in the middle of a corrugate flap and at the edge of the tape. The force gauge was pushed down with sufficient force to compromise the sealed, empty box, which resulted in two primary outcomes; 1) the tape-to-flap bond remained intact and the flap corrugate tore or (2) the tape de-bonded and separated from the flap. If the box flap tore first, and then the tape popped off the corrugate; the individual test result was reported as "Positive" (i.e., it "passed" the test). If the tape separated from the flap before any box damage resulted; then the individual test result was reported as "Negative" (i.e., it "failed" the test). Four replicates were run, top and bottom of two boxes, and the Box Plunge Results were reported as follows:

Positive (POS)=Flap corrugate breaks before tape pops off for 3 or more replicates Negative (NEG)=Tape pops off before box damage evident for 2 or more replicates DMA Creep Compliance Creep compliance is defined as time dependent strain per unit stress (or displacement over time when an adhesive sample is held under a constant stress) and is proportionate to the reciprocal of the modulus. Creep compliance was measured with ARES-G2 rheometer (available from TA Instruments, New Castle, DE) for 1.2 mm thick test samples. Eight thousand (8000) Pa of stress was applied to the sample instantaneously and held constant for 30 min. at 25° C. Data was collected every second (1 point/sec) and the strain was measured as a function of time. The data sets flatten significantly toward 30 minutes for the examples here, and a creep compliance value was reported at 30 minutes. The creep compliance is a measure of adhesive movement (displacement) with time and was used as a rheological parameter to correlate adhesive flow into the corrugate substrate, which is qualitatively measured with Box Plunge test result at a specified point in time. The results for the Box Plunge Test and the DMA Creep Compliance value ($Pa^{-1}$) for each example are reported at 30 mins. of dwell time.

Shear Adhesion to Stainless Steel (SS) or Holding Power to SS (HPS)

ASTM 3654/D3654M-06: Shear Adhesion of Pressure-Sensitive Tapes. 0.5 in. by 0.5 in. square inches ($in^r$) of test tape were bonded to a cleaned stainless-steel panel after 24 hours of controlled temperature and humidity (CTH) conditioning. A 1000-gram weight was hung from the adhered tape sample and the time to failure was measured. The test was stopped after 7000 mins. All failures were cohesive split (SPL) meaning adhesive was left on both the test tape and SS surfaces. Two replicates were measured for each example and the average value was recorded.

Adhesion to Stainless Steel Test (ATS)

ASTM D3330/D3330M-04 (2018), Procedure 1: Peel Adhesive of Pressure Sensitive Tapes, 180-degree peel angle, at 12 inches per minute (3.05 dm per minute) for 15 seconds from stainless steel substrate.

Gel Permeation Chromatography (GPC) Analysis

ASTM D6579-11: "Standard Practice for Molecular Weight Averages and Molecular Weight Distribution of Hydrocarbon, Rosin and Terpene Resins by Size-Exclusion Chromatography."

EXAMPLES AND COMPARATIVE EXAMPLES

Examples 1-19 and Comparative Examples C1-C10 (Solvent Examples)

Comparative Example C1 was prepared by dissolving 22 grams (g) of total solids into 22 g of toluene. The solids consisted of 100 pts (11.22 g) of Q3520 SIS copolymer, 1 phr (0.11 g) of Irg. 1010, 95 phr (10.66 g) of K100 tackifying resin and 0 phr (0.0 g) of C5550 plasticizer. The adhesive solution was coated onto 0.002 inch (50 micron) thick PET film substrate (Polyethylene Terephthalate (PET) release film, 50 micron thickness, single side release coated as provided by supplier, sold as Hostaphan 4365NK from Mitsubishi Polyester Films, Greer, SC, USA) using a 0.005 in. (125 microns) thick gap (above the PET film) using an approximate 3.5 in. (8.9 cm) wide dam. The coating weight was approximately 10 gns/24 in$^2$ (42 GSM). C1 (and all other Examples and Comparative Examples) was coated at a length that was greater than 15 in. (38.1 cm) long. The adhesive TG was calculated using the Fox Equation and was controlled to 260° K (−13° C.) for all Examples and Comparative Examples. One part per hundred (1 phr) of Irg. 1010 was also used for all Examples and Comparative Examples. The formulation information for C1 is contained in Table 1.

Comparative Example C2 was prepared in the same manner as C1 except that 100 pts. (10.19 g) of Q3520, 1 phr Irg. 1010 (0.10 g), 105 phr of K100 (10.69 g) and 10 phr C5550 (1.02 g) were dissolved into 22 g of toluene. Examples 1-19 and Comparative Examples C3-C10 were formulated in the same manner, except with the appropriate ratio of components found in Tables 1 and 2. The coating weights for Comparative Examples C1-C10 and Examples 1-19 were controlled to approximately 10 gns/24 in$^2$ (42 GSM). Table 1 and Table 2 contain the formulation information in parts and wt-%, respectively for C2 and Examples 1-19 and Comparative Examples C3-C10. The test data for Examples 1-19 and Comparative Examples C1-C10 are contained in Table 3.

TABLE 1

Formulations (in Parts) for Examples 1-19 and Comparative Examples C1-C10

| Ex. | SIS Type | SIS (Pts) | Irg. 1010 (phr) | Tack. Type | Tack. (phr) | Oil Type | Oil (phr) | $\chi_r$ | % Sol. | Gap (in.) μm |
|---|---|---|---|---|---|---|---|---|---|---|
| C1 | Q3520 | 100 | 1 | K100 | 95 | C5550 | 0 | 0.51 | 50 | (0.005) 125 |
| C2 | Q3520 | 100 | 1 | K100 | 105 | C5550 | 10 | 0.46 | 50 | (0.005) 125 |
| 1 | Q3520 | 100 | 1 | K100 | 115 | C5550 | 20 | 0.42 | 55 | (0.004) 100 |
| 2 | Q3520 | 100 | 1 | K100 | 125 | C5550 | 25 | 0.40 | 55 | (0.004) 100 |
| 3 | Q3520 | 100 | 1 | K100 | 155 | C5550 | 50 | 0.33 | 55 | (0.004) 100 |
| 4 | Q3520 | 100 | 1 | K100 | 215 | C5550 | 100 | 0.24 | 60 | (0.004) 1100 |
| C3 | Q3520 | 100 | 1 | K100 | 275 | C5550 | 150 | 0.19 | 65 | (0.003) 75 |
| C4 | KD1119 | 100 | 1 | K100 | 145 | C5550 | 50 | 0.34 | 55 | (0.004) 100 |
| 5 | KD1119 | 100 | 1 | K100 | 180 | C5550 | 80 | 0.28 | 60 | (0.004) 100 |
| 6 | KD1119 | 100 | 1 | K100 | 205 | C5550 | 100 | 0.25 | 65 | (0.003) 75 |
| 7 | KD1119 | 100 | 1 | K100 | 265 | C5550 | 150 | 0.19 | 65 | (0.003) 75 |
| 8 | KD1119 | 100 | 1 | K100 | 325 | C5550 | 200 | 0.16 | 65 | (0.003) 75 |
| C5 | Q3433N | 100 | 1 | K100 | 150 | C5550 | 50 | 0.35 | 55 | (0.004) 100 |
| 9 | Q3433N | 100 | 1 | K100 | 205 | C5550 | 100 | 0.25 | 65 | (0.003) 75 |
| 10 | Q3433N | 100 | 1 | K100 | 265 | C5550 | 150 | 0.19 | 65 | (0.003) 75 |
| 11 | Q3433N | 100 | 1 | K100 | 330 | C5550 | 200 | 0.16 | 65 | (0.003) 75 |
| C6 | V4187 | 100 | 1 | K100 | 120 | C5550 | 25 | 0.41 | 55 | (0.004) 100 |
| 12 | V4187 | 100 | 1 | K100 | 150 | C5550 | 50 | 0.33 | 55 | (0.004) 100 |
| 13 | V4187 | 100 | 1 | K100 | 210 | C5550 | 100 | 0.24 | 60 | (0.004) 100 |
| 14 | V4187 | 100 | 1 | K100 | 270 | C5550 | 150 | 0.19 | 60 | (0.004) 100 |
| C7 | V4187 | 100 | 1 | K100 | 330 | C5550 | 200 | 0.16 | 60 | (0.004) 100 |

TABLE 1-continued

Formulations (in Parts) for Examples 1-19 and Comparative Examples C1-C10

| Ex. | SIS Type | SIS (Pts) | Irg. 1010 (phr) | Tack. Type | Tack. (phr) | Oil Type | Oil (phr) | $\chi_r$ | % Sol. | Gap (in.) μm |
|---|---|---|---|---|---|---|---|---|---|---|
| C8 | Q3421 | 100 | 1 | K100 | 155 | C5550 | 50 | 0.33 | 50 | (0.005) 125 |
| 15 | Q3421 | 100 | 1 | K100 | 155 | C5550 | 200 | 0.22 | 65 | (0.005) 125 |
| C9 | V4114 | 100 | 1 | K100 | 150 | C5550 | 50 | 0.33 | 55 | (0.004) 100 |
| 16 | V4114 | 100 | 1 | K100 | 150 | C5550 | 200 | 0.16 | 70 | (0.004) 100 |
| C10 | KD1161 | 100 | 1 | K100 | 150 | C5550 | 50 | 0.33 | 55 | (0.004) 100 |
| 17 | KD1161 | 100 | 1 | K100 | 335 | C5550 | 200 | 0.16 | 70 | (0.004) 100 |
| 18 | Q3520 | 100 | 1 | K100 | 155 | Kaydol | 50 | 0.39 | 55 | (0.004) 100 |
| 19 | Q3520 | 100 | 1 | K100 | 215 | Kaydol | 100 | 0.32 | 55 | (0.004) 100 |

TABLE 2

Formulations (in wt-%) for Examples 1-19 and Comparative Examples C1-C10

| Ex. | SIS Type | SIS (wt-%) | Irg. 1010 (wt-%) | Tack. Type | Tack. (wt-%) | Oil Type | Oil (wt-%) | Fox TG (°K) | $\chi_r$ |
|---|---|---|---|---|---|---|---|---|---|
| C1 | Q3520 | 51.0 | 0.5 | K100 | 48.5 | C5550 | 0 | 260 | 0.51 |
| C2 | Q3520 | 46.3 | 0.5 | K100 | 48.6 | C5550 | 4.6 | 260 | 0.46 |
| 1 | Q3520 | 42.4 | 0.4 | K100 | 48.7 | C5550 | 8.5 | 260 | 0.42 |
| 2 | Q3520 | 39.8 | 0.4 | K100 | 49.8 | C5550 | 10.0 | 260 | 0.40 |
| 3 | Q3520 | 32.7 | 0.3 | K100 | 50.7 | C5550 | 16.3 | 260 | 0.33 |
| 4 | Q3520 | 24.0 | 0.2 | K100 | 51.7 | C5550 | 24.0 | 260 | 0.24 |
| C3 | Q3520 | 19.0 | 0.2 | K100 | 52.3 | C5550 | 28.5 | 260 | 0.19 |
| C4 | KD1119 | 33.8 | 0.3 | K100 | 49.0 | C5550 | 16.9 | 260 | 0.34 |
| 5 | KD1119 | 27.7 | 0.3 | K100 | 49.9 | C5550 | 22.2 | 260 | 0.28 |
| 6 | KD1119 | 24.6 | 0.2 | K100 | 50.5 | C5550 | 24.6 | 260 | 0.25 |
| 7 | KD1119 | 19.4 | 0.2 | K100 | 51.4 | C5550 | 29.1 | 260 | 0.19 |
| 8 | KD1119 | 16.0 | 0.2 | K100 | 51.9 | C5550 | 31.9 | 260 | 0.16 |
| C5 | Q3433N | 33.2 | 0.3 | K100 | 49.8 | C5550 | 16.6 | 260 | 0.35 |
| 9 | Q3433N | 24.6 | 0.2 | K100 | 50.5 | C5550 | 24.6 | 260 | 0.25 |
| 10 | Q3433N | 19.4 | 0.2 | K100 | 51.4 | C5550 | 29.1 | 260 | 0.19 |
| 11 | Q3433N | 15.8 | 0.2 | K100 | 52.3 | C5550 | 31.7 | 260 | 0.16 |
| C6 | V4187 | 40.7 | 0.4 | K100 | 48.8 | C5550 | 10.2 | 260 | 0.41 |
| 12 | V4187 | 33.2 | 0.3 | K100 | 49.8 | C5550 | 16.6 | 260 | 0.33 |
| 13 | V4187 | 24.3 | 0.2 | K100 | 51.1 | C5550 | 24.3 | 260 | 0.24 |
| 14 | V4187 | 19.2 | 0.2 | K100 | 51.8 | C5550 | 28.8 | 260 | 0.19 |
| C7 | V4187 | 15.8 | 0.2 | K100 | 52.3 | C5550 | 31.7 | 260 | 0.16 |
| C8 | Q3421 | 32.7 | 0.3 | K100 | 50.7 | C5550 | 16.3 | 260 | 0.33 |
| 15 | Q3421 | 21.9 | 0.2 | K100 | 34.0 | C5550 | 43.9 | 260 | 0.22 |
| C9 | V4114 | 33.2 | 0.3 | K100 | 49.8 | C5550 | 16.6 | 260 | 0.33 |
| 16 | V4114 | 22.2 | 0.2 | K100 | 33.3 | C5550 | 44.3 | 260 | 0.16 |
| C10 | KD1161 | 33.2 | 0.3 | K100 | 49.8 | C5550 | 16.6 | 260 | 0.33 |
| 17 | KD1161 | 15.7 | 0.2 | K100 | 52.7 | C5550 | 31.4 | 260 | 0.16 |
| 18 | Q3520 | 32.7 | 0.3 | K100 | 50.7 | Kaydol | 16.3 | 260 | 0.39 |
| 19 | Q3520 | 24.0 | 0.2 | K100 | 51.7 | Kaydol | 24.0 | 260 | 0.32 |

TABLE 3

Test Data for Examples 1-19 and Comparative Examples C1-C10

| Ex. | SI (wt-%) | Oil Type (phr) | $\chi_r$ | DMA Creep Compliance (Pa$^{-1}$) | Box Plunge (POS or NEG) | HPS (min) |
|---|---|---|---|---|---|---|
| C1 | 78 | C5550 (0) | 0.51 | nm* | NEG | nm |
| C2 | 78 | C5550 (10) | 0.46 | 1.9E−04 | NEG | nm |
| 1 | 78 | C5550 (20) | 0.42 | nm | POS | nm |
| 2 | 78 | C5550 (25) | 0.40 | 3.2E−04 | POS | 7149 |

TABLE 3-continued

Test Data for Examples 1-19 and Comparative Examples C1-C10

| Ex. | SI (wt-%) | Oil Type (phr) | $\chi_r$ | DMA Creep Compliance ($Pa^{-1}$) | Box Plunge (POS or NEG) | HPS (min) |
|---|---|---|---|---|---|---|
| 3 | 78 | C5550 (50) | 0.33 | 5.5E−04 | POS | 825 |
| 4 | 78 | C5550 (100) | 0.24 | 1.1E−04 | POS | 66 |
| C3 | 78 | C5550 (150) | 0.19 | 1.6E−03 | nm - shear too low | 6 |
| C4 | 66 | C5550 (50) | 0.34 | 1.8E−03 | NEG | 1054 |
| 5 | 66 | C5550 (80) | 0.28 | 2.8E−04 | POS | 438 |
| 6 | 66 | C5550 (100) | 0.25 | 4.1E−04 | POS | 366 |
| 7 | 66 | C5550 (150) | 0.19 | 6.0E−04 | POS | 172 |
| 8 | 66 | C5550 (200) | 0.16 | 1.1E−03 | POS | 25 |
| C5 | 56 | C5550 (50) | 0.35 | 1.2E−04 | NEG | 470 |
| 9 | 56 | C5550 (100) | 0.25 | 3.0E−04 | POS | 122 |
| 10 | 56 | C5550 (150) | 0.19 | 5.2E−04 | POS | 190 |
| 11 | 56 | C5550 (200) | 0.16 | nm | POS | 25 |
| C6 | 78 | C5550 (25) | 0.41 | 1.9E−04 | NEG | 7K+ |
| 12 | 78 | C5550 (50) | 0.33 | 2.6E−04 | POS | 948 |
| 13 | 78 | C5550 (100) | 0.24 | 4.9E−04 | POS | 95 |
| 14 | 78 | C5550 (150) | 0.19 | 7.1E−04 | POS | 23 |
| C7 | 78 | C5550 (200) | 0.16 | 1.0E−03 | nm - shear too low | 6 |
| C8 | 26 | C5550 (50) | 0.33 | 5.5E−05 | NEG | nm |
| 15 | 26 | C5550 (200) | 0.22 | 3.8E−04 | POS | 34 |
| C9 | 42 | C5550 (50) | 0.33 | 8.3E−05 | NEG | 435 |
| 16 | 42 | C5550 (200) | 0.16 | nm | POS | 37 |
| C10 | 19 | C5550 (50) | 0.33 | 4.2E−05 | NEG | 361 |
| 17 | 19 | C5550 (200) | 0.16 | nm | POS | 17 |
| 18 | 78 | KAYDOL (25) | 0.39 | 6.1E−04 | POS | 682 |
| 19 | 78 | KAYDOL (50) | 0.32 | 1.1E−03 | POS | 66 |

*"nm" denotes test was not measured for that example or comparative example

The results in Table 3 demonstrate the following: (a) a preferred low value of the DMA Creep Compliance is 2.0E−04 $Pa^{-1}$ as demonstrated by the change from a positive Box Plunge Test result for Ex. 2 (3.2E−04 $Pa^{-1}$) to a negative Box Plunge Test result for Ex. C2 (1.9E−04 $Pa^{-1}$), this is also demonstrated by comparing C6 (1.9E−04 $Pa^{-1}$) and Ex. 12 (2.6E−04 $Pa^{-1}$); (b) Ex. 1 also demonstrates that a preferred minimum amount of plasticizing oil for a positive Box Plunge Test result is 20 phr; (c) a preferred high value for the DMA Creep Compliance is 1.0E−03 $Pa^{-1}$ as demonstrated by Ex. C7 where the HPS result is too low (Compositions having HPS less than 10 minutes have poor heat aging performance at 120° F. (49° C.) due to too much creep flow); and (d) a preferred low value for the amount of diblock for a positive Box Plunge Test result and acceptable DMA creep compliance value is 19 wt-% as demonstrated by Ex. 17, although it is believed that 15 wt-% will provide acceptable results as well.

Table 4 contains Adhesion to Steel for some of the solvent examples. All solvent coated examples were nonremovable as evidenced by cohesive split upon removal during the Adhesion to Steel test in the results presented in Table 4.

TABLE 4

Adhesion to Steel for Solvent Examples

| Example # | ATS (oz/in) | ATS (N/cm) | Failure Mode |
|---|---|---|---|
| 1 | 125 | 13.9 | Spl |
| 4 | 100 | 11.1 | Spl |
| 10 | 99 | 11.0 | Spl |
| 13 | 73 | 8.1 | Spl |
| 14 | 80 | 8.9 | Spl |
| 16 | 94 | 10.5 | Spl |
| 17 | 68 | 7.6 | Spl |

"Spl" means cohesive failure upon 180° peel removal test (ATS) from stainless-steel surface Hot Melt Examples 20-31 and Comparative Examples C11-C17

Examples 20-31 and Comparative Examples C11-C17 were prepared by a hot melt extrusion compounding and coating method. Hot melt coated samples were prepared using a STEER-India (Bangalore, India) 40 mm diameter, 48:1 length/diameter (L/D) fully intermeshing and counter rotating twin-screw extruder (TSE) having a combination of shear dispersing (kneading) and distributive (transverse mixing gear—TME) mixing elements. The extruder had ten barrel sections and seven injection points, designated BBL1 to BBL7. Synthetic rubber pellets were gravimetrically fed into a cooled feed throat at BBL1. Antioxidant was either fed gravimetrically or melted and injected into BBL1. Tackifying resin was melted and sequentially injected downstream at 15/30/55 wt-% into BBL3/BBL4/BBL5. Plasticizing oil was injected downstream from the tackifying resin into BBL7. The TSE barrel temperature profile set point was maintained at 350° F. (177° C.) and the screw speed (RPM) was set to 350 RPM (except where noted otherwise). The melt temperature was measured in BBL1 and ranged from 400-430° F. (204-221° C.), dependent on the synthetic rubber type and screw speed. The TSE was discharged at a rate of 15 lbs./hr (113.5 g/min) into a 5.0 cc/rev metering gear pump, which fed a flexible heated hose and contact rotary rod die having a 4 in. (10.2 cm) wide deckle and 0.010 in (0.25 mm). The rotating rod had a 0.5 in (12.7 mm) diameter and was rotated at 10 rpm in the forward (with the moving web) direction. For Examples 29-31 and Comparative Examples C11-C17, samples were coated with a conventional drop die, having a die temperature range of 280-350° F. (138-177° C.). The gear pump, hose and die temperatures ranged from 330-350° F. (166-177° C.). The gear pump discharge rate (RPM) and web speed were adjusted to provide target coating weights of 10 gns/24 in² (42 GSM) coated directly onto a 0.002 inch (50 microns) thick PET film substrate (Polyethylene Terephthalate (PET) release film, 50-micron thickness, single side release coated as provided by supplier, sold as Hostaphan 4365NK from Mitsubishi Polyester Films, Greer, SC, USA). Tables 5 and 6 contain the formulation information in parts and wt-%, respectively. Table 7 contains the process information and Table 8 contains the test data for Examples 20-31 and Comparative Examples C11-C17.

TABLE 5

Formulations (in Parts) for Examples 20-31 and Comparative Examples C11-C17

| Ex. | SIS Type | SIS (Pts.) | Irg. 1076 (phr) | Tack. Type | Tack, (phr) | Oil Type | Oil (phr) | Fox TG (° K) | $\chi_r$ |
|---|---|---|---|---|---|---|---|---|---|
| 20 | Q3520 | 100 | 2 | K100 | 125 | C5550 | 30 | 257 | 0.39 |
| 21 | Q3520 | 100 | 2 | K100 | 125 | C5550 | 30 | 257 | 0.39 |
| 22 | Q3520 | 100 | 2 | K100 | 150 | C5550 | 50 | 260 | 0.33 |
| 23 | Q3520 | 100 | 2 | K100 | 110 | C850 | 30 | 257 | 0.41 |
| 24 | Q3520 | 100 | 2 | K100 | 120 | C850 | 40 | 257 | 0.38 |
| 25 | KD1119 | 100 | 2 | K100 | 170 | C850 | 100 | 257 | 0.27 |
| 26 | KD1119 | 100 | 2 | K100 | 170 | C850 | 100 | 257 | 0.27 |
| 27 | V4187 | 100 | 2 | K100 | 155 | C850 | 80 | 257 | 0.30 |
| 28 | V4187 | 100 | 2 | K100 | 155 | C850 | 80 | 257 | 0.30 |
| C11 | Q3520 | 100 | 2 | K100 | 100 | C5550 | 0 | 262 | 0.49 |
| C12 | Q3520 | 100 | 2 | K100 | 125 | C5550 | 20 | 262 | 0.41 |
| 29 | Q3520 | 100 | 2 | K100 | 150 | C5550 | 40 | 262 | 0.34 |
| 30 | Q3520 | 100 | 2 | K100 | 180 | C5550 | 60 | 262 | 0.29 |
| 31 | Q3520 | 100 | 2 | K100 | 205 | C5550 | 80 | 262 | 0.26 |
| C13 | Q3433N | 100 | 2 | K100 | 100 | C5550 | 0 | 262 | 0.49 |
| C14 | Q3433N | 100 | 2 | K100 | 125 | C5550 | 20 | 262 | 0.41 |
| C15 | Q3433N | 100 | 2 | K100 | 150 | C5550 | 40 | 262 | 0.34 |
| C16 | Q3433N | 100 | 2 | K100 | 180 | C5550 | 60 | 262 | 0.29 |
| C17 | Q3433N | 100 | 2 | K100 | 205 | C5550 | 80 | 262 | 0.26 |

TABLE 6

Formulations (in wt-%) for Examples 20-31 and Comparative Examples C11-C17

| Ex. | SIS Type | SIS (wt-%) | Irg. 1076 (wt-%) | Tack. Type | Tack. (wt-%) | Oil Type | Oil (wt-%) | Fox TG (° K) | $\chi_r$ |
|---|---|---|---|---|---|---|---|---|---|
| 20 | Q3520 | 38.9 | 0.8 | K100 | 48.6 | C5550 | 11.7 | 257 | 0.39 |
| 21 | Q3520 | 38.9 | 0.8 | K100 | 48.6 | C5550 | 11.7 | 257 | 0.39 |
| 22 | Q3520 | 33.1 | 0.7 | K100 | 49.7 | C5550 | 16.6 | 260 | 0.33 |
| 23 | Q3520 | 41.3 | 0.8 | K100 | 45.5 | C850 | 12.4 | 257 | 0.41 |
| 24 | Q3520 | 38.2 | 0.8 | K100 | 45.8 | C850 | 15.3 | 257 | 0.38 |
| 25 | KD1119 | 26.9 | 0.5 | K100 | 45.7 | C850 | 26.9 | 257 | 0.27 |
| 26 | KD1119 | 26.9 | 0.5 | K100 | 45.7 | C850 | 26.9 | 257 | 0.27 |
| 27 | V4187 | 29.7 | 0.6 | K100 | 46.0 | C850 | 23.7 | 257 | 0.30 |
| 28 | V4187 | 29.7 | 0.6 | K100 | 46.0 | C850 | 23.7 | 257 | 0.30 |
| C11 | Q3520 | 49.5 | 1.0 | K100 | 49.5 | C5550 | 0 | 262 | 0.49 |
| C12 | Q3520 | 40.5 | 0.8 | K100 | 50.6 | C5550 | 8.1 | 262 | 0.41 |
| 29 | Q3520 | 34.2 | 0.7 | K100 | 51.4 | C5550 | 13.7 | 262 | 0.34 |
| 30 | Q3520 | 29.2 | 0.6 | K100 | 52.6 | C5550 | 17.5 | 262 | 0.29 |
| 31 | Q3520 | 25.8 | 0.5 | K100 | 53.0 | C5550 | 20.7 | 262 | 0.26 |
| C13 | Q3433N | 49.5 | 1.0 | K100 | 49.5 | C5550 | 0 | 262 | 0.49 |
| C14 | Q3433N | 40.5 | 0.8 | K100 | 50.6 | C5550 | 8.1 | 262 | 0.41 |
| C15 | Q3433N | 34.2 | 0.7 | K100 | 51.4 | C5550 | 13.7 | 262 | 0.34 |
| C16 | Q3433N | 29.2 | 0.6 | K100 | 52.6 | C5550 | 17.5 | 262 | 0.29 |
| C17 | Q3433N | 25.8 | 0.5 | K100 | 53.0 | C5550 | 20.7 | 262 | 0.26 |

TABLE 7

Process Data for Examples 20-31 and Comparative Examples C11-C17

| Ex | TSE Screw Speed (rpm) | BBL2-3 Set Pt. ° F. (° C.) | BBL4-8 Set Pt. ° F. (° C.) | BBL9-10 Set Pt. ° F. (° C.) | GP/Hose/Die Set Pt. ° F. (° C.) | GP RPM | Web Speed fpm (mpm) | Ave. Ct. Wt. gns./24 in² (GSM) |
|---|---|---|---|---|---|---|---|---|
| 20 | 350 | 360 (182) | 350 (177) | 340 (171) | 350 (177) | 12.0 | 40 (12.2) | 8 (34) |
| 21 | 500 | 360 (182) | 350 (177) | 340 (171) | 350 (177) | 12.0 | 40 (12.2) | 8 (34) |
| 22 | 350 | 360 (182) | 350 (177) | 350 (177) | 330 (166) | 9.5 | 40 (12.2) | 10 (42) |

TABLE 7-continued

Process Data for Examples 20-31 and Comparative Examples C11-C17

| Ex | TSE Screw Speed (rpm) | BBL2-3 Set Pt. ° F. (° C.) | BBL4-8 Set Pt. ° F. (° C.) | BBL9-10 Set Pt. ° F. (° C.) | GP/Hose/Die Set Pt. ° F. (° C.) | GP RPM | Web Speed fpm (mpm) | Ave. Ct. Wt. gns./24 in² (GSM) |
|---|---|---|---|---|---|---|---|---|
| 23 | 350 | 360 (182) | 350 (177) | 340 (171) | 350 (177) | 15.2 | 40 (12.2) | 10 (42) |
| 24 | 350 | 360 (182) | 350 (177) | 340 (171) | 350 (177) | 14.5 | 40 (12.2) | 10 (42) |
| 25 | 350 | 360 (182) | 350 (177) | 330 (166) | 330 (166) | 15.2 | 40 (12.2) | 10 (42) |
| 26 | 500 | 360 (182) | 350 (177) | 330 (166) | 330 (166) | 19.0 | 40 (12.2) | 10 (42) |
| 27 | 350 | 360 (182) | 350 (177) | 330 (166) | 330 (166) | 15.7 | 40 (12.2) | 10 (42) |
| 28 | 500 | 360 (182) | 350 (177) | 330 (166) | 330 (166) | 15.2 | 40 (12.2) | 10 (42) |
| C11 | 300 | 275 (135) | 350 (177) | 350 (177) | 350 (177) | 27 | 40 (12.2) | 10** (42) |
| C12 | 300 | 275 (135) | 350 (177) | 350 (177) | 350 (177) | 27 | 40 (12.2) | 10** (42) |
| 29 | 300 | 275 (135) | 350 (177) | 350 (177) | 350 (177) | 27 | 40 (12.2) | 10** (42) |
| 30 | 300 | 275 (135) | 350 (177) | 300 (149) | 300 (149) | 27 | 40 (12.2) | 10** (42) |
| 31 | 300 | 275 (135) | 350 (177) | 280 (138) | 280 (138) | 28 | 40 (12.2) | 10** (42) |
| C13 | 300 | 275 (135) | 350 (177) | 350 (177) | 350 (177) | 26 | 40 (12.2) | 10** (42) |
| C14 | 300 | 275 (135) | 350 (177) | 350 (177) | 350 (177) | 26 | 40 (12.2) | 10** (42) |
| C15 | 300 | 275 (135) | 350 (177) | 350 (177) | 350 (177) | 28 | 40 (12.2) | 10** (42) |
| C16 | 300 | 275 (135) | 350 (177) | 300 (149) | 300 (149) | 27.5 | 40 (12.2) | 10** (42) |
| C17 | 300 | 275 (135) | 350 (177) | 280 (138) | 280 (138) | 26.5 | 40 (12.2) | 10** (42) |

TABLE 8

Test Data for Examples 20-31 and Comparative Examples C11-C17

| Ex. | SI wt-% (TSE RPM) | Oil Type (phr) | Ave. Ct. Wt. gns./24 in² (GSM) | $\chi_{cr}$ | DMA Creep Compliance (Pa$^{-1}$) | Box Plunge (POS or NEG) | HPS (min) |
|---|---|---|---|---|---|---|---|
| 20 | 79.5* (350) | C5550 (30) | 8 (34) | 0.39 | 4.6E−04 | POS | 324 |
| 21 | 81.3* (500) | C5550 (30) | 8 (34) | 0.39 | 6.4E−04 | POS | 60 |
| 22 | 78 (350) | C5550 (50) | 10 (42) | 0.33 | 6.5E−04 | POS | 27 |
| 23 | 78 (350) | C850 (30) | 10 (42) | 0.41 | 4.6E−04 | POS | 563 |
| 24 | 78 (350) | C850 (40) | 10 (42) | 0.38 | 4.7E−04 | POS | 223 |
| 25 | 66 (350) | C850 (100) | 10 (42) | 0.27 | 3.7E−04 | POS | 123 |
| 26 | 66 (500) | C850 (100) | 10 (42) | 0.27 | 4.1E−04 | POS | 73 |
| 27 | 78 (350) | C850 (80) | 10 (42) | 0.30 | 5.1E−04 | POS | 62 |
| 28 | 78 (500) | C850 (80) | 10 (42) | 0.30 | 7.2E−04 | POS | 61 |
| C11 | 78 (350) | C5550 (0) | 10** (42) | 0.50 | 1.7E−04 | NEG | nm |
| C12 | 78 (350) | C5550 (20) | 10** (42) | 0.41 | 3.6E−04 | NEG | nm |
| 29 | 78 (350) | C5550 (40) | 10** (42) | 0.34 | 5.1E−04 | POS | nm |
| 30 | 78 (350) | C5550 (60) | 10** (42) | 0.29 | 6.9E−04 | POS | nm |

TABLE 8-continued

Test Data for Examples 20-31 and Comparative Examples C11-C17

| Ex. | SI wt-% (TSE RPM) | Oil Type (phr) | Ave. Ct. Wt. gns./24 in² (GSM) | $\chi_c$ | DMA Creep Compliance (Pa⁻¹) | Box Plunge (POS or NEG) | HPS (min) |
|---|---|---|---|---|---|---|---|
| 31 | 78 (350) | C5550 (80) | 10** (42) | 0.26 | 8.9E−04 | POS | nm |
| C13 | 56 (350) | C5550 (0) | 10** (42) | 0.50 | 5.0E−05 | NEG | nm |
| C14 | 56 (350) | C5550 (20) | 10** (42) | 0.41 | 8.0E−05 | NEG | nm |
| C15 | 56 (350) | C5550 (40) | 10** (42) | 0.34 | 1.3E−04 | NEG | nm |
| C16 | 56 (350) | C5550 (60) | 10** (42) | 0.29 | 2.0E−04 | NEG | nm |
| C17 | 56 (350) | C5550 (80) | 10** (42) | 0.26 | 3.6E−04 | NEG | nm |

*Diblock SI level as measured by GPC. Diblock level for remainder of examples are as published by supplier for incoming SIS copolymer.
**Coating weight values are an average and overall target; however, due to non-uniformity in coating die set up for these examples, coating weight and thickness varied significantly, and some areas fell out of the 6-12 grn/24 in² (25-50 GSM) desired range. This variation has no effect on creep compliance values; however, box plunge results could be somewhat affected.

It is commonly known that hot melt processing of SIS block copolymers typically increases the overall diblock content. So it would be assumed that actual diblock content of all samples would be slightly higher, as observed by comparing Ex. 20, as measured directly by GPC. and Ex. 22, which is the published diblock content value for the incoming copolymer. Also, increasing the TSE screw speed from baseline 350 rpm to 500 rpm increased diblock content and resulted in higher creep values as exhibited by Ex. 20 (350 rpm) vs. Ex. 21 (500 rpm), Ex. 25 (350 rpm) vs. Ex. 26 (500 rpm) and Ex. 27 (350 rpm) vs. Ex. 28 (500 rpm). Increasing the extruder screw speed increased the amount of barrel wall shear on the polymer melt which results in conversion of triblock SIS to diblock SI as evidenced by GPC analysis of Ex. 20 vs. Ex. 21 where the higher screw speed increased the amount of diblock SI by approximately 2.2% as measured by GPC Test. The TSE screw speed is a hot melt process variable that can be used to increase the level of diblock SI and resulting creep flow into the 100% recycled corrugate surface. This result is also consistent with a comparison of solvent vs. hot melt processing of a similar formulation as evidenced by comparing Ex. 3 to Ex. 22. The DMA Creep Compliance values are 5.5E-04 Pa⁻¹ vs. 6.5E-04 Pa⁻¹ indicating a higher level of diblock SI (increase in the DMA Creep Compliance value) for the hot melt vs. solvent example.

The complete disclosures of the patents, patent documents, and publications cited herein are incorporated by reference in their entirety as if each were individually incorporated. Various modifications and alterations to this invention will become apparent to those of ordinary skill in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

What is claimed is:

1. A pressure sensitive adhesive article comprising:
a backing having two major surfaces, at least one of which has a pressure sensitive adhesive layer disposed thereon, wherein the pressure sensitive adhesive layer has an average thickness of 25 microns to 50 microns and comprises: a styrene-isoprene-containing block copolymer comprising a styrene-isoprene (SI) diblock copolymer and a styrene-isoprene-styrene (SIS) triblock copolymer, wherein: the total amount of styrene-isoprene diblock copolymer is 15 wt-% to 85 wt-%, based on the total weight of SI diblock and SIS triblock copolymers; and the total amount of styrene is 10 wt-% to 24 wt-%, based on the total weight of styrene and isoprene;
a tackifier; and
an oil in an amount of 20 to 200 parts per one hundred parts of the styrene-isoprene-containing block copolymer;
wherein the pressure sensitive adhesive demonstrates a creep compliance at 30 minutes of greater than 2.0× 10⁻⁴ Pa⁻¹.

2. The pressure sensitive adhesive article of claim 1 wherein the pressure sensitive adhesive demonstrates a holding power to stainless steel of 10 minutes to 1000 minutes.

3. The pressure sensitive adhesive article of claim 1 wherein the pressure sensitive adhesive has a Fox glass transition temperature (Tg) of −30° C. to 0° C.

4. The pressure sensitive adhesive article of claim 1 wherein the total amount of styrene-isoprene diblock copolymer is 55 wt-% to 85 wt-%, based on the total weight of SI diblock and SIS triblock copolymers.

5. The pressure sensitive adhesive article of claim 1 wherein the pressure sensitive adhesive comprises a tackifier in an amount of 100 parts to 365 parts per one hundred parts styrene-isoprene-containing block copolymer.

6. The pressure sensitive adhesive article of claim 1 wherein the pressure sensitive adhesive comprises a styrene-isoprene-containing copolymer in an amount of 10 wt-% to 40 wt-%, based on the total weight of the pressure sensitive adhesive.

7. The pressure sensitive adhesive article of claim 1 wherein the styrene-isoprene-containing block copolymer is a linear or radial block copolymer.

8. The pressure sensitive adhesive article of claim 1 wherein the styrene-isoprene-containing block copolymer has a melt flow index of 5 g/10 min to 30 g/10 min.

9. The pressure sensitive adhesive article of claim 1 wherein the backing comprises a polyethylene, a polypropylene, a polyester, a rubber, a vinyl, a paper, a polylactic acid, or a combination thereof.

10. The pressure sensitive adhesive article of claim 1 which is nonremovable.

11. The pressure sensitive adhesive article of claim 1 which is an adhesive tape or an adhesive label.

12. The pressure sensitive adhesive article of claim 11 which forms a destructive bond to recycled corrugate.

13. An article comprising recycled corrugate having a pressure sensitive adhesive article of claim 1 adhered thereto.

14. A sealed article comprising:
a first portion of recycled corrugate;
a second portion of recycled corrugate;
a pressure sensitive article adhered to both the first and second portions, the pressure sensitive article comprising:
   a backing having two major surfaces, at least one of which has a pressure sensitive adhesive layer disposed thereon;
   wherein the pressure sensitive adhesive layer has an average thickness of 25 microns to 50 microns and comprises:
      a styrene-isoprene-containing block copolymer comprising a styrene-isoprene (SI) diblock copolymer;
      a styrene-isoprene-styrene (SIS) triblock copolymer;
      wherein: the total amount of styrene-isoprene diblock copolymer is 15 wt-% to 85 wt-%, based on the total weight of SI diblock and SIS triblock copolymers; and
      the total amount of styrene is 10 wt-% to 24 wt-%, based on the total weight of styrene and isoprene;
   a tackifier; and
   an oil in an amount of 20 to 200 parts per one hundred parts of the styrene-isoprene-containing block copolymer.

15. A method of sealing a package, the method comprising: providing packaging material comprising recycled corrugate; and
sealing the packaging material with a pressure sensitive adhesive article of claim 1.

16. A method of making a pressure sensitive adhesive article, the method comprising: providing a backing having two major surfaces; providing a coatable adhesive comprising: a styrene-isoprene-containing block copolymer comprising a styrene-isoprene (SI) diblock copolymer and a styrene-isoprene-styrene (SIS) triblock copolymer, wherein: the total amount of styrene-isoprene diblock copolymer is 15 wt-% to 85 wt-%, based on the total weight of SI diblock and SIS triblock copolymers; and the total amount of styrene is 10 wt-% to 24 wt-%, based on the total weight of styrene and isoprene;
a tackifier; and
an oil in an amount of 20 to 200 parts per one hundred parts of the styrene-isoprene-containing block copolymer;
applying the coatable adhesive composition to at least one major surface of the backing;
and exposing the coatable adhesive composition to conditions effective to harden the composition and form a layer of a pressure sensitive adhesive having an average thickness of 25 microns to 50 microns; wherein the pressure sensitive adhesive demonstrates a creep compliance at 30 minutes of greater than $2.0 \times 10^{-4}$ $Pa^{-1}$.

* * * * *

UNITED STATES PATENT AND TRADEMARK OFFICE
CERTIFICATE OF CORRECTION

| | |
|---|---|
| PATENT NO. | : 12,305,095 B2 |
| APPLICATION NO. | : 17/309341 |
| DATED | : May 20, 2025 |
| INVENTOR(S) | : Scott M. Tapio |

Page 1 of 1

It is certified that error appears in the above-identified patent and that said Letters Patent is hereby corrected as shown below:

In the Claims

<u>Column 32</u>
Line 40, Claim 1, delete "$10\text{-}^4\ Pa\text{-}^1$" and insert -- $10^{-4}\ Pa^{-1}$ --, therefor.

<u>Column 34</u>
Line 32, Claim 16, delete "$10\text{-}^4\ Pa\text{-}^1$" and insert -- $10^{-4}\ Pa^{-1}$ --, therefor.

Signed and Sealed this
Second Day of September, 2025

Coke Morgan Stewart
*Acting Director of the United States Patent and Trademark Office*